United States Patent
Leather et al.

(10) Patent No.: US 12,230,890 B2
(45) Date of Patent: Feb. 18, 2025

(54) METHODS AND MEASUREMENT SYSTEMS FOR PRECISELY EVALUATING A DEVICE UNDER TEST

(71) Applicant: Fraunhofer-Gesellschaft zur Foerderung der angewandten Forschung e.V., Munich (DE)

(72) Inventors: Paul Simon Holt Leather, Berlin (DE); Ramez Askar, Berlin (DE); Kei Sakaguchi, Berlin (DE); Thomas Haustein, Potsdam (DE); Leszek Raschkowski, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/935,039

(22) Filed: Sep. 23, 2022

(65) Prior Publication Data
US 2023/0198143 A1 Jun. 22, 2023

Related U.S. Application Data

(63) Continuation of application No. 16/712,776, filed on Dec. 12, 2019, now Pat. No. 11,456,531, which is a
(Continued)

(30) Foreign Application Priority Data

Jun. 16, 2017 (EP) .................................... 17176398

(51) Int. Cl.
*H01Q 3/26* (2006.01)
*H04B 5/73* (2024.01)
(Continued)

(52) U.S. Cl.
CPC .......... *H01Q 3/267* (2013.01); *H01Q 3/2676* (2013.01); *H04B 5/73* (2024.01); *H04B 10/073* (2013.01); *H04B 17/102* (2015.01); *H04B 17/23* (2015.01)

(58) Field of Classification Search
CPC ........ H01Q 3/267; H01Q 3/2676; H04B 5/73; H04B 10/073; H04B 17/102; H04B 17/23; H04B 17/15; H04B 17/29
(Continued)

(56) References Cited

U.S. PATENT DOCUMENTS 5,825,331 A 10/1998 Lee
7,203,489 B2 4/2007 Saunders
(Continued)

FOREIGN PATENT DOCUMENTS

CN 101320062 A 12/2008
CN 101965050 A 2/2011
(Continued)

OTHER PUBLICATIONS

"CATT: "Text proposal on OTA sensitivity requirements"," 3GPP Draft; R4-145628, 3rd Generation Partnership Project (3GPP), Mobile Competence Centre; Oct. 2014.
(Continued)

*Primary Examiner* — Eugene Yun
(74) *Attorney, Agent, or Firm* — Perkins Coie LLP; Michael A. Glenn

(57) ABSTRACT

A method includes defining a Center-of-Radiation Reference for a device under test, the CORR indicating a reference origin of an electromagnetic wave pattern formable with the DUT; determining a 3-dimensional orientation information with respect to the CORR, the 3-dimensional orientation information indicating a direction of the electromagnetic
(Continued)

wave pattern; and providing the CORR and the 3-dimensional orientation information to a measurement system.

4 Claims, 13 Drawing Sheets

Related U.S. Application Data continuation of application No. PCT/EP2018/065860, filed on Jun. 14, 2018.

(51) Int. Cl.
   *H04B 10/073* (2013.01)
   *H04B 17/10* (2015.01)
   *H04B 17/23* (2015.01)

(58) Field of Classification Search
   USPC ........................................................ 455/41.1
   See application file for complete search history.

(56) References Cited

U.S. PATENT DOCUMENTS

| | | | |
|---|---|---|---|
| 8,519,889 | B2 | 8/2013 | Steer et al. |
| 8,706,044 | B2 | 4/2014 | Chang et al. |
| 10,581,855 | B1* | 3/2020 | Donovan .............. G06F 3/0488 |
| 2006/0220635 | A1 | 10/2006 | Kazama et al. |
| 2011/0043418 | A1 | 2/2011 | Teshirogi et al. |
| 2014/0266930 | A1 | 9/2014 | Huynh |
| 2017/0324486 | A1 | 11/2017 | Garcia et al. |
| 2018/0006745 | A1 | 1/2018 | Vanwiggeren |

FOREIGN PATENT DOCUMENTS

| | | | |
|---|---|---|---|
| EP | 2392932 | A1 | 12/2011 |
| JP | 2004138505 | A | 5/2004 |
| JP | 2006201007 | A | 8/2006 |
| JP | 2009251856 | A | 10/2009 |
| JP | 2010122044 | A | 6/2010 |
| JP | 2016519450 | A | 6/2016 |
| JP | 2016142609 | A | 8/2016 |
| JP | 2017031140 | A | 2/2017 |
| JP | 2019569706 | A | 6/2018 |
| WO | 2006103878 | A1 | 10/2006 |

OTHER PUBLICATIONS

"RAN4 72bis Meeting report", 3GPP Draft; R4-146837_RAN4-72BIS_REPORT, 3rd Generation Partnership Project (3GPP), Mobile Competence Centre; Nov. 2014.
Friden, J., et al., "Calculation of Antenna Radiation Center Using Angular Momentum", IEEE Transactions on Antennas and Propagation, IEEE Service Center, Piscataway, NJ, US, vol. 61, No. 12, Dec. 1, 2013 (Dec. 1, 2013 ), pp. 5923-5930, XP011532777.
Kurokawa, S., et al., "Antenna gain pattern estimation for log periodic dipole array broadband antenna using near field radiation pattern and amplitude center", 2016 IEEE International Conference on Computational Electromagnetics (ICCEM), IEEE, Feb. 23, 2016 (Feb. 23, 2016), pp. 191-193, XP032978198.
IEEE Standard Test Procedures for Antennas, in ANSI/IEEE Std 149-1979 , vol. no., pp. 0_1-, 1979, reaffirmed 1990, 2003, 2008., 1979, Dec. 15, 1977, 135 pages.
S. Kurokawa and M. Hirose, "Antenna gain pattern estimation for log periodic dipole array broadband antenna using near field radiation pattern and amplitude center," Guangzhou, 2016, pp. 191-193., Feb. 2016.
3GPP TR 37.842; V13.2.0 (Mar. 2017), "Evolved Universal Terrestrial Radio Access (E-UTRA) and Universal Terrestrial Radio Access (UTRA; Radio Frequency (RF) requirement background for Active Antenna System (AAS) Base Station (BS)", Mar. 2017, 131 pages.
3GPP TR 37.976; V14.0.0.0 (Mar. 2017), "Measurement of radiated performance for Multiple Input Multiple Output (MIMO) and multi-antenna reception for High Speed Packet Access (HSPA) and LTE terminals", Mar. 2017, 74 pages.
3GPP TS 37.145-2; V14.0.0 (Mar. 2017), "Active Antenna System (AAS) Base Station (BS) conformance testing; Part 2: radiated conformance testing", Mar. 2017, 48 pages.
IEEE Standard for Definitions of Terms for Antennas, in IEEE Std 145-2013 (Revision of IEEE Std 145-1993), Mar. 6, 2014, 50 pages.
Caner Ozdemir, Rajan Bhalla, and Hao Ling, "A Radiation Center Representation of Antenna Radiation Patterns on a Complex Platform", IEEE Transactions on Antennas and Propagation, vol. 48, No. 6, Jun. 2000, pp. 992-1000.
"CATT: Text Proposal on OTA Sensitivity Requirements", 3GPP Draft; R4-145628, 3RD Generation Partnership Project (3GPP), Mobile Competence CTR; France, vol. RAN WG4, no. Singapore; Oct. 2014; XP050878147, Retrieved from the Internet: URL:http://www.3gpp.org/ftp/Meetings_3GPP_SYNC/RAN4/Docs/, Oct. 2014, 4 pages.
"RAN4#72bis Meeting Report", 3GPP Draft; R4-146837_RAN4-72BIS_REPORT, 3rd Generation Partnership Project (3GPP), Mobile Competence CTR; France, vol. RAN WG4, no. Singapore; XP050887562, URL:http://www.3gpp.org/ftp/tsg_ran/WG4_Radio/TSGR4_72Bis/Report/ [retrieved on Nov. 18, 2014], Oct. 2014, 432 pages.
Ehrenborg, Casimir , "Investigation and Comparison Between Radiation and Phase Center for Canonical Antennas", Department of Electrical and Information Technology, Faculty of Engineering, LTH, Lund University, Jun. 2014, 80 pages.
Friden, Jonas , et al., "Calculation of Antenna Radiation Center Using Angular Momentum", IEEE Transactions on Antennas and Propagation, IEEE Service Center, Piscataway, NJ, US, vol. 61, No. 12, Dec. 1, 2013 (Dec. 1, 2013), pp. 5923-5930, XP011532777, ISSN: 0018-926X, DOI: 10.1109/TAP.2013.2283033 [retrieved on Nov. 25, 2013], Dec. 2013, 8 pages.
Carl E. Mungan, "Approximation for the Rayleigh Resolution of a Circular Aperture", The Physics Teacher, vol. 47, May 2009, XP055980122—2 pages.

\* cited by examiner

100

| Defining a Center-of-Radiation Reference (CORR) for a device under test (DUT), the CORR indicating a reference origin of an electromagnetic wave pattern formable with the DUT | ~110 |

| Determining a 3-dimensional orientation information with respect to the CORR, the 3-dimensional orientation information indicating a direction of the electromagnetic wave pattern | ~120 |

| Providing the CORR and the 3-dimensional orientation information to a measurement system | ~130 |

| Determining a set of reference markers at the DUT, the set of reference markers visible when looking at the DUT or accessible from the outside of the DUT | ~210 |

| Defining a coordinate system using the reference markers | ~220 |

| Defining the CORR within the coordinate system | ~230 |

```
┌─────────────────────────────────────────────┐
│ Defining a set of electromagnetic wave      │
│ patterns formable with the DUT, the set of  │──410
│ electromagnetic wave patterns including     │
│ the electromagnetic wave pattern            │
└─────────────────────────────────────────────┘
                      │
┌─────────────────────────────────────────────┐
│ Determining, a directional deviation of a   │
│ direction of the electromagnetic wave       │
│ pattern with respect to a reference         │
│ direction;                                  │──420
│                                             │
│ such that the 3-dimensional orientation     │
│ information allows to indicate the          │
│ reference origin and the direction of the   │
│ electromagnetic wave pattern with respect   │
│ to the CORR                                 │
└─────────────────────────────────────────────┘
```

```
┌─────────────────────────────────────────────┐
│ Defining a set of electromagnetic wave      │
│ patterns formable with the DUT, the set of  │──410
│ electromagnetic wave patterns including     │
│ the electromagnetic wave pattern            │
└─────────────────────────────────────────────┘
                      │
┌─────────────────────────────────────────────┐
│ Determining, for each of the electromagnetic│
│ wave patterns within the set of             │
│ electromagnetic wave patterns,              │──460
│ an offset of the reference origin of the    │
│ electromagnetic wave pattern with respect   │
│ to the CORR                                 │
└─────────────────────────────────────────────┘
```

Fig. 4b

METHODS AND MEASUREMENT SYSTEMS FOR PRECISELY EVALUATING A DEVICE UNDER TEST

CROSS-REFERENCES TO RELATED APPLICATIONS

This application is a continuation of copending International Application No. PCT/EP2018/065860, filed Jun. 14, 2018, which is incorporated herein by reference in its entirety, and additionally claims priority from European Application No EP 17 176 398.0, filed Jun. 16, 2017, which is incorporated herein by reference in its entirety.

The present invention relates to methods for providing information on how to evaluate a device under test (DUT), to a method for evaluating a DUT using such information, to a DUT and to a measurement system. The present invention further relates to a computer program. In particular, the present invention relates to a method of defining "Center-of-Radiation Reference-CORR" and a coordinate system as well as to radio emitting and receiving components and a positioning thereof in a 3D space. In addition to positioning the DUT at the correct location using the CORRP, the DUT may also be appropriately aligned.

BACKGROUND OF THE INVENTION

A center-of-radiation of an antenna or antenna array formed by a multitude of antennas is a term familiar to one skilled in the art and as such is defined in IEEE Std 145-2013 "IEEE Standard for Definitions of Terms for Antennas" [1].

In Over-the-Air (OTA) measurements, e.g., for beam (radiated beam pattern) characterization, probes are distributed around the device under test (DUT). Using knowledge about the position of the emitting DUT and the measurement probes around and about all distances between them, the emitted beam pattern may be measured, e.g., by rotation of the DUT and by measuring many sample points in a coordinated manner. Such a mechanism is known for antenna pattern characterization [2] using antenna measurements, i.e., antenna radiation pattern measurements that are measured OTA. It is expected for future communication systems that the antenna connector (in current 3GPP standards e.g. Release 8-14, so called conducted measurements are standardized for antenna port measurements) as it is known will become a thing of the past. Therefore, it is expected that the OTA measurement of radio performance parameters and antenna performance parameters will become a thing of the future. In future, many of the antenna measurements can only be done in such a way, i.e., OTA, since no access to the antenna port is available and/or the antenna array consists of many individual elements which work in a joint manner. Furthermore, such antennas might be embedded inside the housing of devices like, e.g., smartphones, and therefore, their radiation has to be measured although the antennas are inside the device. The exact location of the antenna(s) is (are) unknown as they are hidden inside the device housing. Hence, this would make the measurement inaccurate as long as the measured radiation pattern cannot be referenced to the exact location of the antennas [3, 4, 5]. Furthermore, miniature antenna sizes compared to the device housing may cause even higher inaccuracy.

In addition, the carrier frequencies used for radio transmission define the distance between the DUT and the probe when the radio wave propagation can be assumed far-field which is often used for measurements. In order to reduce the size of the measurement chamber/device, measurements can also be performed in the so called near field and such sample points have to be transformed into a far field equivalent. In order to do so, it is of utmost importance that the origin of the emitted beam is known exactly, otherwise the measurement would conclude a misalignment of the beam result in many preventable errors [4]. Furthermore, when measuring in near field, the far field pattern is derived by a near field to far field transformation, in which the exact distance from the radiation origin and the measurement probes is vital for accurate transformation.

So far, antennas and antenna arrays are individually positioned on a positioner which can move and/or tilt and/or rotate them in a referenced center point of a measurement chamber or a measurement system which is not in a chamber. This may involve exact knowledge where the radio wave is actually transmitted from. Orientation and rough positioning of the DUT in order to measure broad side or bore side of one or more antenna elements may also be performed. In 3GPP TS 37.145-2 [6] there is defined a manufacture's declaration (MD) including an origin of coordinate system and an associated coordinate system for correctly positioning an active antenna system (AAS) on the carrier in the chamber for a correct alignment. In 3GPP TR 37.976 [7], which addresses the radiated performance measurement of multiple input and multiple output (MIMO) devices, and 3GPP TR 37.842 which describes OTA testing of AAS, further examples of over-the-testing are given.

Thus, there is a need for providing methods, a DUT, a measurement system, and a computer program as associated software that allow for precisely OTA measuring a DUT.

SUMMARY

According to an embodiment a method may have the steps of: defining a Center-of-Radiation Reference for a device under test, the CORR indicating a reference origin of an electromagnetic wave pattern formable with the DUT; determining a 3-dimensional orientation information with respect to the CORR, the 3-dimensional orientation information indicating a direction of the electromagnetic wave pattern; and providing the CORR and the 3-dimensional orientation information to a measurement system.

According to another embodiment a method may have the steps of: receiving information indicating a Center-of-Radiation Reference for a device under test, the CORR indicating a reference origin of an electromagnetic wave pattern formed with the DUT and receiving a 3-dimensional orientation information with respect to the CORR, the 3-dimensional orientation information indicating a direction of the electromagnetic wave pattern; and evaluating the detected radio frequency electromagnetic wave pattern with respect to a match with the CORR and the 3-dimensional orientation information.

According to another embodiment an apparatus may have: a display; and an interface configured to receive a signal indicating a request that the apparatus is requested to perform a test mode; wherein the apparatus is configured to switch to the test mode responsive to the signal and to display a predefined optical signal pattern with the display, the optical signal pattern providing at least a part of a set of reference markers at the apparatus.

Another embodiment may have a measurement system configured to perform an inventive method.

Another embodiment may have a non-transitory digital storage medium having a computer program stored thereon to perform the method including: defining a Center-of-Radiation Reference for a device under test, the CORR indicating a reference origin of an electromagnetic wave pattern formable with the DUT; determining a 3-dimensional orientation information with respect to the CORR, the 3-dimensional orientation information indicating a direction of the electromagnetic wave pattern; and providing the CORR and the 3-dimensional orientation information to a measurement system, when said computer program is run by a computer.

Another embodiment may have a non-transitory digital storage medium having a computer program stored thereon to perform the method including: detecting a radio frequency electromagnetic wave pattern from a DUT; receiving information indicating a Center-of-Radiation Reference for a device under test, the CORR indicating a reference origin of an electromagnetic wave pattern formed with the DUT and receiving a 3-dimensional orientation information with respect to the CORR, the 3-dimensional orientation information indicating a direction of the electromagnetic wave pattern; and evaluating the detected radio frequency electromagnetic wave pattern with respect to a match with the CORR and the 3-dimensional orientation information, when said computer program is run by a computer.

The inventors have found that by defining a Center-of-Radiation Reference (Point) for a device under test and by determining a location and directivity information with respect to said reference point, the location information indicating an origin (reference point, reference origin or, measurement origin) of a beam and a direction of the beam, the DUT may be evaluated with a high precision as the scope of evaluation may be referenced to the reference point and the beam to be evaluated which may allow for obtaining information about precise location of the one or more antennas within DUT unknown and to simultaneously obtain precise measurements.

According to an embodiment, a method comprises defining a Center-of-Radiation Reference Point (CORRP) for a DUT. The method further comprises determining a location information with respect to the CORRP, the location information indicating a reference origin of a beam formable with the DUT and indicating a direction of the beam. The method further comprises providing the CORRP and the location information to a measurement system. This allows to reference a beam method by the DUT without a precise knowledge about the position of the antenna array or the combination of antennas involved in the creation of a particular beam pattern.

According to an embodiment, defining the CORRP comprises determining a set of reference markers at the DUT, the set of reference markers is visible when looking at the DUT, such visible marked could also be replaced by any other appropriate physical feature accessible from the outside of the DUT. Further, a coordinate system is defined, using the reference markers and the CORRP defined within the coordinate system. This may allow to reference the reference origin and the direction of the beam with respect to reference markers visible when looking at the DUT. Although referring to one Center-of-Radiation Reference (CORR), also a higher number of CORR may be defined, for example, at different positions inside and/or outside and/or at the surface of the DUT. This may allow to enhance practical measurements.

According to an embodiment, the set of reference markers comprises at least one of an optical signal pattern displayed on a display of the DUT, a lens of DUT, a light emitting device of the DUT, an electrical or acoustical port of the DUT. This may allow to use existing physical features of the DUT without modifying a specimen of an apparatus which is thereby no longer in accordance with a product that may be sold.

According to an embodiment, determining the location information comprises defining a set of beams formable with the DUT, the set of beams including the beam, and comprises determining, for each of the beams within the set of beams, an offset of a reference origin of the beam with respect to the CORRP and a directional deviation from a beam direction with respect to a reference direction such that the location information allows to indicate the reference origin and the beam direction with respect to the CORRP. This may allow to indicate the parameters of the DUT with respect to the CORRP.

According to an embodiment, the beam is formable with at least a first and a second antenna or antenna array of the DUT. By using the location information referring to the CORRP, a plurality of beams that commonly form a single beam in the far field but are a combination of beams generated with different antenna arrays may be characterized where information respective to a single antenna array and a measurement of such a single beam with respect to the antenna array would provide insufficient information due missing information with respect to the second antenna array.

According to an embodiment, a method comprises detecting a radio frequency beam from a DUT, receiving information indicating a CORRP for a DUT and receiving a location information indicating a reference origin of a beam formed with the DUT with respect to the CORRP and indicating a direction of the beam. The method further comprises evaluating the detected radio frequency beam with respect to a match with the CORRP and the location information. This allows it to evaluate the DUT, the beam respectively, using the CORRP which may allow to avoid detailed knowledge about an interior of the DUT.

According to an embodiment, the method, further comprises determining a position of the DUT using a set of markers of the DUT and determining an expected location for the radio frequency beam using the position of the DUT and the direction of the beam in a 3D-coorindate system being defined by the set of markers. This may allow to use probably immobile or standardized markers for aligning the DUT.

According to an embodiment, determining the position of the DUT comprises holding the DUT with a structure of a measurement environment, detecting a position of the set of markers at the DUT and determining the position of the DUT within the measurement environment using the position of the set of markers in the measurement environment. This may allow to link the position markers and the CORRP to locations/positions within the measurement environment.

According to an embodiment, the location information comprises information indicating at least one main lobe of the beam and/or at least one side lobe of the beam. Evaluating the detected radio frequency beam comprises an evaluation of the detected radio frequency beam with respect to the at least one main lobe of the beam and/or the at least one side lobe of the beam. This may allow for a detailed characterization of the beam.

According to an embodiment, the method further comprises adjusting a position of the DUT such that the reference origin of the beam forms a center of the measurement environment; or determining a misalignment between a predetermined center of the measurement environment and the reference origin of the beam and correcting a result of the evaluating of the detected radio frequency beam using the determined misalignment. This may allow to adjust a measurement or to correct measurement results based on an actual position of the beam with respect to the DUT. Thereby, a detailed knowledge of the position and directivity of an antenna array within the DUT may be unnecessary and/or deviations of the actual position of the antenna array with respect to a specified position (desired condition) may be compensated. In many applications the actual beam pattern is of interest, wherein a position of antenna arrays within the DUTs is either of low interest or is aimed to be kept secret by the supplier. By using embodiments described herein, the position of the emitted beam may be evaluated without referring to the position of the antenna arrays. Furthermore, such specified position might effectively change while the DUT is subject to interaction with other matter e.g. holding a mobile phone close to the ear. If done under well specified conditions again a beam pattern can be measured according to a potentially changed reference point.

According to an embodiment, detecting a radio frequency beam from the DUT comprises detecting the beam transmitted by the DUT or comprises detecting the beam with the DUT. Thus, transmit beams, as well as, receive beams may be evaluated.

According to an embodiment, the CORRP is determined such that it is located outside a volume of the DUT, at the surface of an enclosure of the DUT or inside the enclosure of the DUT e.g. inside a car. This may allow to use an arbitrary point within the defined coordinate system.

According to an embodiment, the location information comprises information indicating a frequency associated to the radio frequency beam. This may allow to incorporate the frequency range in the measurements performed, for example, for defining a distance between the DUT and probes of the measurement system.

According to an embodiment, the CORRP is distinct from a center of an antenna array of the DUT. This may allow to use the CORRP without knowledge of the position of the antenna array. For this purpose, the location information associated with the CORRP may comprise additional information, e.g., about the carrier frequency and/or the intended kind of beam pattern to be radiated.

According to an embodiment, an apparatus comprises a display and an interface configured to receive a signal indicating a request that the apparatus is requested to perform a test mode. This apparatus is configured to switch to the test mode responsive to the signal and to display a predefined optical signal pattern with the display. The optical signal pattern provides at least a part of a set of reference markers at the DUT. This may allow to use any apparatus of the series to be tested as DUT and may further allow to adapt the set of reference markers by adapting the optical signal pattern e.g. QR-code.

According to an embodiment, the apparatus is configured to display the optical signal pattern independently from a user input indicating a change of displaying the optical signal pattern. This may to allow to display the optical signal pattern independently from a user command that might lead to a modification of the set of reference markers and, therefore, to a deviation in the determined CORRP.

According to an embodiment, the optical signal pattern is a barcode of one or more dimensions including a matrix barcode for example a Quick Response code (QR-code). This may allow to implement a two-dimensional pattern and, therefore, a two-dimensional set of reference markers at a surface of the DUT which may be monitored and captured when looking or viewing at the DUT. Furthermore, by using a matrix pattern of a known dimensions, image processing techniques can be used to determine its position relative to the optical reading device thus enabling the position of the DUT in three-dimensional space to be determined.

According to an embodiment, the apparatus is configured to subsequently switch on one of a plurality of test modes and to subsequently display one of a plurality of optical signal patterns, the displayed optical signal pattern associated with the current mode. This may allow to use different CORRPs for different test modes and, therefore, for precise test conditions.

According to an embodiment, a measurement system is configured to perform a method described herein.

According to an embodiment, the location information used by the measurement system comprises information indicating a first reference origin of a first beam and a second reference origin of a second beam and a first direction information of the first beam and a second direction information of the second beam. The measurement system is configured for evaluating the detected radio frequency beam with respect to a match of a super position with the first beam and the second beam. This allows to evaluate beams that are formed by emission or/and reception of two or more antenna or antenna arrays.

According to an embodiment, the measurement system is adapted to detect the beam in a near field of the beam and to extrapolate a characteristic of the beam in a far field of the beam. This may allow for a small dimension of the measurement system.

Further embodiments relate to a non-transitory computer program product comprising a computer readable medium storing instruction which, when executed on a computer, carry out a method according to embodiments described herein.

BRIEF DESCRIPTION OF THE DRAWINGS

Embodiments of the present invention will be detailed subsequently referring to the appended drawings, in which:

FIG. 1 is a schematic flowchart of a method according to an embodiment;

FIG. 2 is a schematic flowchart of a method according to an embodiment, that may be implemented, for defining a Center-of-Radiation Reference Point (CORRP);

FIG. 4a is a schematic flowchart of a method according to an embodiment, that may be implemented for determining a location information;

FIG. 4b is a schematic flowchart of a method according to an embodiment, that may be implemented for determining a Center-of-Radiation Reference;

FIG. 5b is a schematic flow chart of a method according to an embodiment, that may be implemented, as part of a step of the method according to FIG. 5a;

DETAILED DESCRIPTION OF THE INVENTION

Figure 3A:
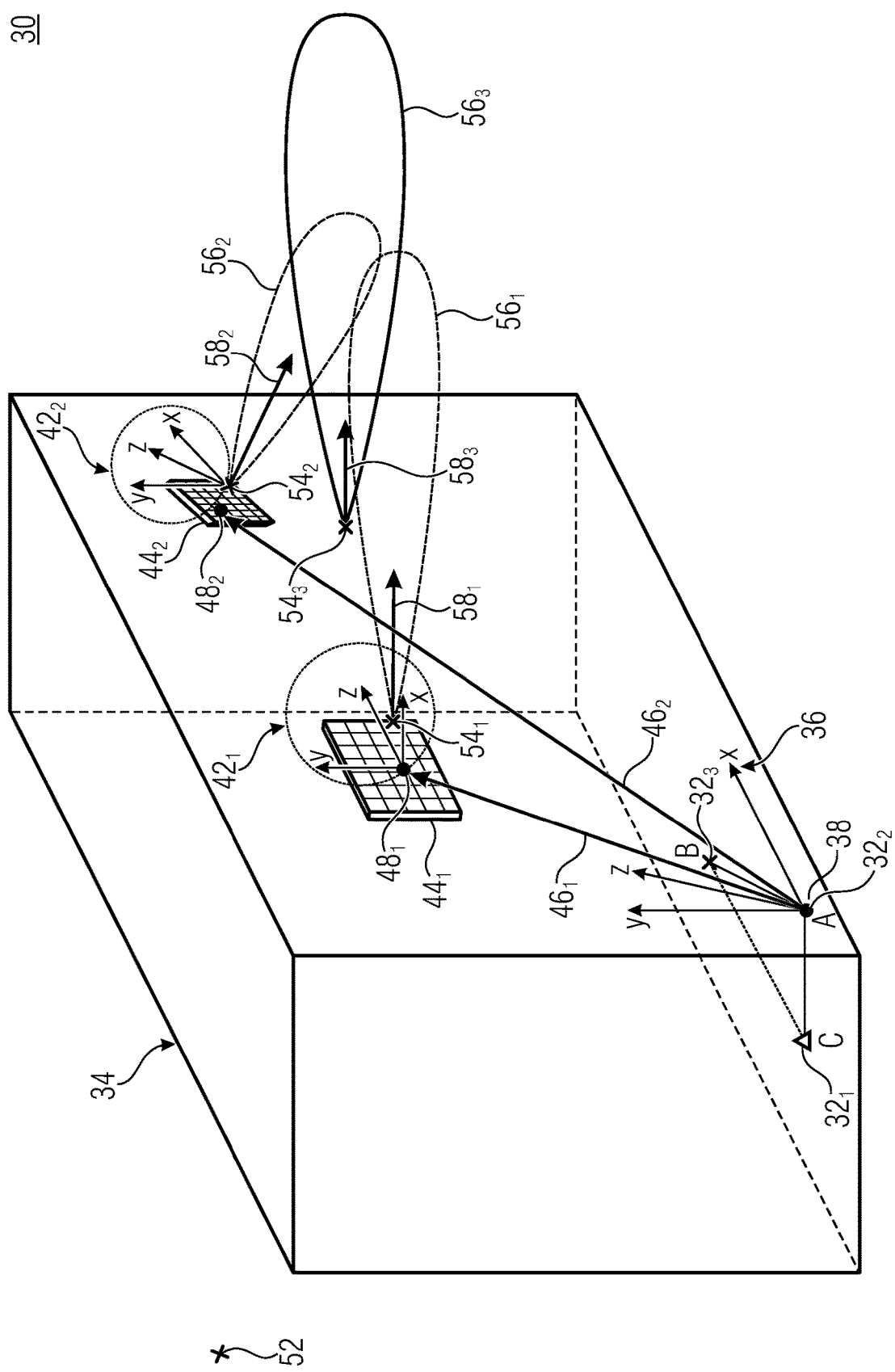
FIG. 3a is a schematic perspective view of a DUT according to an embodiment.

Equal or equivalent elements or elements with equal or equivalent functionality are denoted in the following description by equal or equivalent reference numerals even if occurring in different figures.

Embodiments described herein relate to beams, in particular, in connection with techniques relating to beamforming. Beams associated to a device, e.g., a DUT, may define one or more advantageous directions along which electromagnetic energy is emitted with the DUT, or along with electromagnetic energy may be received with the DUT. In the case of transmitting a signal, the beam may comprise one or more main lobes and one or more side lobes, wherein a main lobe refers to a desired radiation pattern and/or a direction thereof. A side lobe may relate to a disturbing and/or inevitable direction along which radiation is emitted with a respective pattern. This description refers without any limitation to the receive scenario in which, comparable to a directional characteristic of a microphone, directions may be defined with the main lobes that allow for a high gain during reception of electromagnetic energy. Therefore, when referring to a beam, this shall be understood as relating to the transmit scenario and/or the receive scenario. Although referring to, hereinafter, to beams, the embodiments relate to other forms of electromagnetic wave transmit or receive pattern, i.e., an electromagnetic pattern at the radio frequency without any limitation. Such patterns may be referenced to by a source described by a point that forms the transmit and/or receive pattern along a line or plane/surface. An example for such electromagnetic wave transmit or receive patterns may be implemented by a leaky feeder line, i.e., a cable with slots to radiate perpendicular to the cable. Such a leaky feeder line may be used to connect trains in tunnels. In this particular example, the reference for the emitted electromagnetic field may be a line.

A DUT according to the disclosed embodiments may be any device that is configured to radiate and/or receive electromagnetic radiation at radio frequency for wireless communication, for example, a user equipment (UE), a base station (BS) and/or an active antenna system (AAS).

Embodiments described herein may relate to probes that may be used in a measurement system. Such a probe may comprise active elements such as an antenna element and/or an antenna array configured to generate and/or transmit electromagnetic energy, for example, when performing beamforming within the measurement system. Alternatively or in addition, the probe may comprise sensing elements, for example, an antenna (element) and/or an antenna array, that is configured to receive electromagnetic energy that may be emitted, for example, with the DUT. Thus, when referring to a DUT forming a beam that is detected or determined with the measurement system, this may relate to a transmission of electromagnetic energy with one or more probes, the electromagnetic energy to be received with the DUT, wherein the DUT may transmit a feedback signal indicating one or more characteristics of reception. Alternatively or in addition, the DUT may be adapted to transmit electromagnetic energy, wherein the probes may receive said energy and may feedback a characteristic of reception to the measurement system and/or information that allows to determine such a characteristic with the measurement system.

Embodiments described herein may relate to antenna arrays that are used for receiving and/or transmitting electromagnetic radiation. An antenna array may comprise one or a higher number of antennas, for example, at least one, at least two, at least five, at least ten or a higher number such as more than 50 or the like. Thus, an antenna array shall not be limited to a structure comprising a plurality of antennas but may also comprise only one antenna.

FIG. 1 is a schematic flowchart of a method 100 according to an embodiment. Method 100 comprises a step 110 in which a Center-of-Radiation Reference (CORR) is defined for a device under test. The CORR may relate to a point (CORRP), a line (CORRL) or an area (CORRA). Thus, P in CORRP can also have the meaning of line and surface beyond the usual meaning of point. The CORR indicates a reference origin of an electromagnetic wave pattern, e.g., a beam or a different pattern, formable with the DUT. The CORR may be, for example, congruent with the reference origin or may comprise same at least partially. Alternatively, the CORR may be arranged at a different position and may comprise information about an offset between the CORR and the reference origin. In a step 120 a 3-dimensional orientation information is determined with respect to the CORR, the 3-dimensional orientation information indicating a direction of the electromagnetic wave pattern. The 3-dimensional orientation information may be referred to as location information. A combination of the CORR and the 3-dimensional orientation information allows to specify the origin and the propagation of the electromagnetic wave pattern in space. A step 130 comprises providing the CORR and the 3-dimensional orientation information (location information) to a measurement system.

In the following, embodiments will be described with reference to a Center-of-Radiation Reference Point (CORRP). The examples described may refer, without any limitation to CORR in general and/or to CORRL and/or CORRA in specific. I.e., although the CORRP is named as a point and thus with a minimum extension in space, the CORRP may alternatively relate to a direction or line along which the radiation extends. For example, the CORRP may be arranged along or parallel to a center of a main lobe of the radiation. In other words, the center-of-radiation may also be a line such as a leaky feeder cable. Furthermore, a direction starting from or ending in the center of radiation is to be described/defined by embodiments in order to describe a radiated and/or received antenna pattern which is to be measured when investigating/measuring the DUT. The CORR may be a virtual projection into a point, line or plain, e.g., in case that a multitude of antennas is distributed at distances of several wavelengths and the resulting far filed antenna pattern is a superposition of the radiated electromagnetic waves from the individual antennas.

Instead of only one CORR/CORRP, a plurality of two or even more CORR may be defined. The different CORR may be defined, for example, at different positions inside and/or outside and/or at the surface of the DUT. The location information for a single electromagnetic wave pattern/beam may be generated for one, some or each of the plurality of CORR, i.e., a specific electromagnetic wave pattern formed with the DUT may be described by one or more location information relating to a specific CORR each. This may allow to enhance practical measurements. For example, when considering a car as a DUT, such variety of CORRP may be helpful in practical terms if, e.g., the radiated pattern inside or outside of a car is measured.

FIG. 2 is a schematic flowchart of a method 200 that may be implemented, for example, when performing the step 110. A step 210 comprises determining a set of reference markers at the DUT, the set of reference markers visible when looking at the DUT. This may include but is not limited to a visibility of the set of reference markers when using human eyes. A set of reference markers visible when looking at the DUT may alternatively or in addition comprise a use of technical means to identify markers that are invisible for the human eye. Examples for such markers are small markers or markers that use physical properties beyond human capabilities, for example, ultraviolet markers or infrared markers, as well as, use of temperature, embedded magnetic sources or the like. Thus, the markers may at least be accessible. A step 220 comprises defining a coordinated system using the reference markers. The coordinate system may be referred to as a first coordinate system or a global coordinate system that allows to navigate through a three-dimensional space. For example but not necessarily, the defined coordinate system may comprise three perpendicular axes, i.e., it may be formed as a Cartesian coordinate system. Alternatively or in addition, other coordinate systems may be used, for example, a spherical coordinate system or a cylindrical coordinate system or a linear coordinate system or a planar coordinate system. A step 230 comprises defining the CORRP within the coordinate system. The CORRP may be selected or defined as an arbitrary point within in the coordinate system. For example, the CORRP may be a specific point within the measurement environment such as a specific probe or object. The coordinate of the CORRP may indicate a relative position of the CORRP and the DUT and may thus relate to an exact positioning of the DUT within the measurement environment such as a measurement chamber. Alternatively, the CORRP may be any other point, e.g., decoupled from objects in the measurement environment.

Based on the definition of the coordinate system in connection with the reference markers that are connected to the DUT, the CORRP is thereby also connected to the DUT and probably to the measurement environment which allows linking the position of the DUT with positions in the measurement environment. Advantageously, the reference markers are immobile in the present test scenario, i.e., the CORRP is also immobile with respect to the DUT. For example, the set of reference markers may at least partially be an immobile marker such as a physical feature, e.g., a lens of the DUT, a light emitting device of the DUT, e.g., a flashlight, an electrical port and/or an acoustical port of the DUT and/or an electromagnetic or magnetic pattern. According to embodiments, the set of reference markers may at least be partially implemented by a signal pattern that may be displayed at a display of the DUT, which may therefore be referred to as an optical signal pattern. This allows for obtaining, determining and reproducing the CORRP based on the set of reference markers. Thereby, the location information characterizing the beam formable with the DUT, may also be evaluated using the set of reference markers and thereby without precise knowledge of an interior of the DUT.

FIG. 3 shows a schematic perspective view of a DUT 30 according to an embodiment, for describing the method 100 and 200.

A set of reference markers $32_1$, $32_2$ and $32_3$ may be arranged at a housing 34 of the DUT 30. The set of reference markers $32_1$ to $32_3$ may be arranged on a same side of the DUT housing 34 but may also be arranged at different sides with respect to each other. Although three markers $32_1$ to $32_3$ may be sufficient to define a three-dimensional coordinate system, 36, a higher number of references markers may also be used. It is also possible to use a lower number, for example, 2, when the geometric relation between the two selected reference markers is known, wherein the known geometric relation may therefore provide for the missing information.

A center of origin 38 of the three-dimensional coordinate system 36 may comprise an arbitrary location and may be located, by non-limiting example only, at a location of one of the reference markers $32_1$, $32_2$ or $32_3$, such as $32_2$. Alternatively, any other position within the 3D coordinate system 36 may be used as reference position as any other position therein may be referred to it.

In other words, the reference markers or reference points $32_1$ to $32_3$ marked with A,B,C may be arranged outside of the DUT 30 and may span the coordinate system 36 and/or may define the center of origin 38 of the coordinate system 36.

According to 3GPP relative coordinate systems $42_1$ and $42_2$ may be be defined in connection with antenna arrays $42_1$ and $42_2$ of the DUT 30. A different number of antenna arrays 44 may be present, for example, 1, 3, 4 or more. For defining the relative coordinate systems $42_1$ in connection with antenna array $44_1$ and the relative coordinate system $42_2$ in connection with the antenna array $44_2$ relative pointers $46_1$ and $46_2$ may be used to point to reference positions $48_1$, $48_2$ respectively of the antenna arrays $44_1$, $44_2$ respectively. This involves precise knowledge of a position of the antenna arrays $44_1$ and $44_2$. This contradicts the interest of manufactures to not disclose the precise location of the antenna array which might give a hint on how beams are exactly generated.

According to the present disclosure, a CORRP 52 is defined in an arbitrary position of the three-dimensional coordinate system 36. Thereby, the CORR may be defined so as to correlate to one or more of the markers $32_1$ to $32_3$ of the DUT as well as to the reference origin of an emitted beam. The CORR may be located at a position of at least one of the markers $32_1$ to $32_3$. At this step, knowledge about a measurement condition or environment may be used, i.e., how the DUT will be positioned within later tests. I.e., the CORRP 52 may be arranged at another location, for example, outside a volume of the DUT 30, i.e., outside the housing 34. Alternatively, the CORRP may be defined at the surface of an enclosure of the DUT or inside the enclosure of the DUT e.g. inside a car. The CORRP 52 may be set to a specific point within that environment. Alternatively or in addition, the CORRP 52 may be congruent with one of the set of reference markers $32_1$, $32_2$ or $32_3$, or even with the center of origin in 38. When the position of the DUT is known in later tests, this is thereby true for the set of reference markers. According to the present embodiments, reference origins $54_1$ and/or $54_2$ of beams $56_1$ and/or $56_2$ may be defined as part of the location information. The reference origin may be understood as a physical or theoretical origin of the beam. Such an origin may be different from the reference position 48, in particular, when the reference position 48 indicates a center of the antenna array. For generating a specific beam 56, a subset of antenna elements of the antenna array 44 may be used such that the beam may have a reference origin being anywhere on the antenna array. In particular, different beams may comprise different reference origins on the antenna array. The location information may include further information such as a positioning of an surface of the antenna array in the 3D space, a directions of emissions (beams), and/or a reference point (reference origin) in combination with vectors for emission. The location information may further comprise information such as information indicating a power used for forming the wave patter e.g., a used power and/or a power class of the beam. For example, a side lobe suppression may be performed with an antenna array by tapering and/or if a beam is emitted at high power, medium or low power. Alternatively or in addition, the location information associated with the CORRP may comprise information, e.g., about the carrier frequency and/or the intended kind of beam pattern, i.e., information indicating the 3D pattern, to be radiated. Furthermore, the location information may comprise information indicating if the radiated beam is composed/superimposed by of one or several individual beams. This allows the CORRP being different from each other, i.e., for the components superimposing. In some scenarios, e.g., during measurements in the near filed, a joint information may be questionable and/or not meaningful, wherein an information relating to the single components may be of advance. Such a case may be of interest, if e.g. a common signal is transmitted with the superposition of the two or more beams while other part of information is transmitted only using the one or not all superpositioned beams. This may be relevant for control channel information, while user data might be multiplexed to independent beams (time-frequency resources might be differently mapped onto spatially resources provided by the beams).

When considering now a use of two or more antenna arrays, for example, both of the antenna arrays $44_1$ and $44_2$ to generate a combined beam $56_3$, it may occur that a reference origin $54_3$ of the beam $56_3$ may even be outside one or both of the antenna arrays $44_1$ and $44_2$. By non-limiting example, the beams $56_1$ and $56_2$ may both together form the beam $56_3$. The beams $56_1$ and $56_2$ may be distinguishable or discriminable in the near field but may form the common beam $56_3$ in the far field. In the far field, the beam $56_3$ may therefore have a single reference origin $54_3$ associated with beam $56_3$.

When considering now a DUT enclosed by a housing 34 and unknown positions of the antenna arrays $44_1$ and $44_2$ therein, it is difficult to evaluate beams generated by one or more of the antenna arrays $44_1$ and/or $44_2$. With information according to 3GPP that rely on the position of the antenna arrays. In contrast here to, when the defining the reference origins and further defining directions $58_1$, $58_2$ and/or $58_3$ associated with the beams $56_1$ to $56_3$, a radiation of the antenna arrays, i.e., the beams, may be measured even in absence of knowledge relating to the position of the antenna elements. According to some embodiments, e.g., the beam $56_3$, the position of the antenna $44_1$ and $44_2$ may even be unimportant when forming the common beam $56_3$. The directions $58_1$, $58_2$ and/or $58_3$ may be defined as a direction within the 3D coordinate system 36 and may therefore relate to a direction with respect to the set f markers $32_1$ to $32_3$.

The CORR 52 may be a position in a 3D space. The 3-dimensional orientation information may be a vector in the same space, wherein the CORR may be used as reference location or as a center. The CORR may thus contain a reference with respect to the accessible markers 32, wherein every position and/or direction, i.e., wave pattern origins and directions thereof may be described with respect to the CORR and thereby to the markers.

Figure 3B:
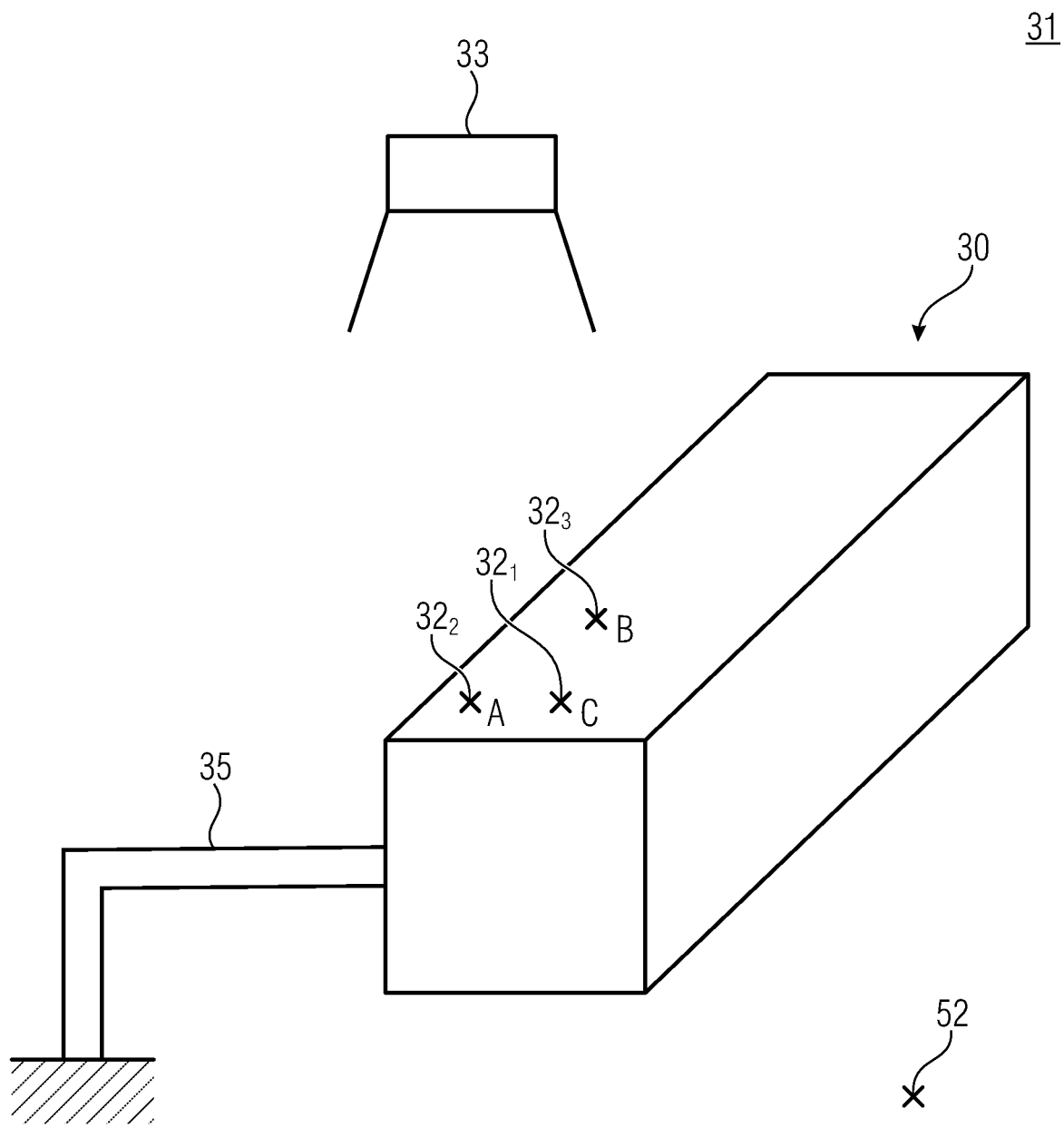
FIG. 3b is a schematic perspective view of a part of a measurement environment that may be used to evaluate the DUT, according to an embodiment.

FIG. 3b is a schematic perspective view of a part of a measurement environment 31 that may be used to evaluate the DUT 30. For example, the measurement environment 31 may receive or obtain information about the set of markers $32_1$ to $32_3$ that allows to determine a position and/or orientation, advantageously both, of the DUT in the three-dimensional space, advantageously in the coordinate system 36. The measurement environment 31 may comprise a device 33 configured to detect at least some of the set markers $32_1$ to $32_3$ at the DUT 30. The device 33 may be, for example, a camera, a scanner, a reader or the like.

The measurement environment 31 may comprise a structure 35 configured to define and/or adapt the position of the DUT 30. The structure 35 may be or may include a carrier, a fixture, a jig, a holder, a mount, a container, a positioner or the like in order to hold the DUT 30 for OTA measurements to then be made using probes that are not shown in FIG. 3b. During the tests, the structure 35 may be configured to move the DUT 30 with respect to not shown probes, e.g., rotate and/or tilt and/or translate the DUT 30. Alternatively or in addition the not shown probes may be moved with respect to the DUT 30. According to embodiments, the DUT 30 may be placed and/or moved by a manual placement, a robot or manipulator placement, a conveyer belt, an automatic and/or semi-automatic handling system or the like.

The measurement environment 31, for example, a control unit thereof, may link information relating to the position of the set of markers $32_1$ to $32_3$ within the measurement environment 31 with the location information indicating the position of the CORRP 52. Thereby a link between positions and coordinates within the measurement environment 31 and the 3D coordinate system being defined by the set of markers 32 to $32_3$ may be obtained. Thus, by combining the known position of the markers $32_1$ to $32_3$, i.e., plane(s) and/or edge(s) and/or corner(s) and/or some other feature(s) of the DUT 30, together with the CORRP 52, the appropriate placement of the DUT in the structure 35 may be ensured. The control unit may use information about the position of the structure 35 within the environment and information of the markers $32_1$ to $32_3$ within the measurement environment, e.g., of the markers $32_1$ to $32_3$ relative to the device 33 that has a known relative position with respect to the structure 35. The control unit may further have knowledge about further parameters of the DUT, e.g., a position of edges, surfaces or planes with respect to the markers $32_1$ to $32_3$ and thereby about a shape of the DUT.

A method according to embodiments may comprise determining of a position of the DUT using a set of markers $32_1$ to $32_3$ of the DUT 30 and determining an expected location for the radio frequency beam using the position of the DUT 30 and the direction of the beam 56 in a 3D-coorindate system being defined by the set of markers $32_1$ to $32_3$. This expected location may be used as value or set of values against which the measurement data is compared for evaluating the DUT 30. The method may be implemented such that the determining the position of the DUT comprises holding the DUT 30 with the structure and detecting a position of the set of markers $32_1$ to $32_3$ at the DUT 30 and determining the position of the DUT within the measurement environment 31 using the position of the set of markers $32_1$ to $32_3$ in the measurement environment 31.

According to embodiments, knowledge of the CORRP is be combined with knowledge of a geometric feature of the DUT 30, i.e., the markers $32_1$ to $32_3$. Through the combination of these two pieces of information, the reference point CORRP 52 and a reference direction of a beam may be determined. To determine the direction a minimum of either three points, or a single point combined with a plane and/or edges and/or corners and/or fixed features may be used. Thus, a position of the DUT 30 may be determined using the set of markers $32_1$ to $32_3$. An expected location or a nominal value of a location where the DUT is expected to form the beam may be determined using the position of the DUT 30 and the direction information received. This may be done using the 3D-coorindate system being defined by the set of markers 32 which may be identical to or at least transferable from the 3D coordinate system 36.

Figure 3D:
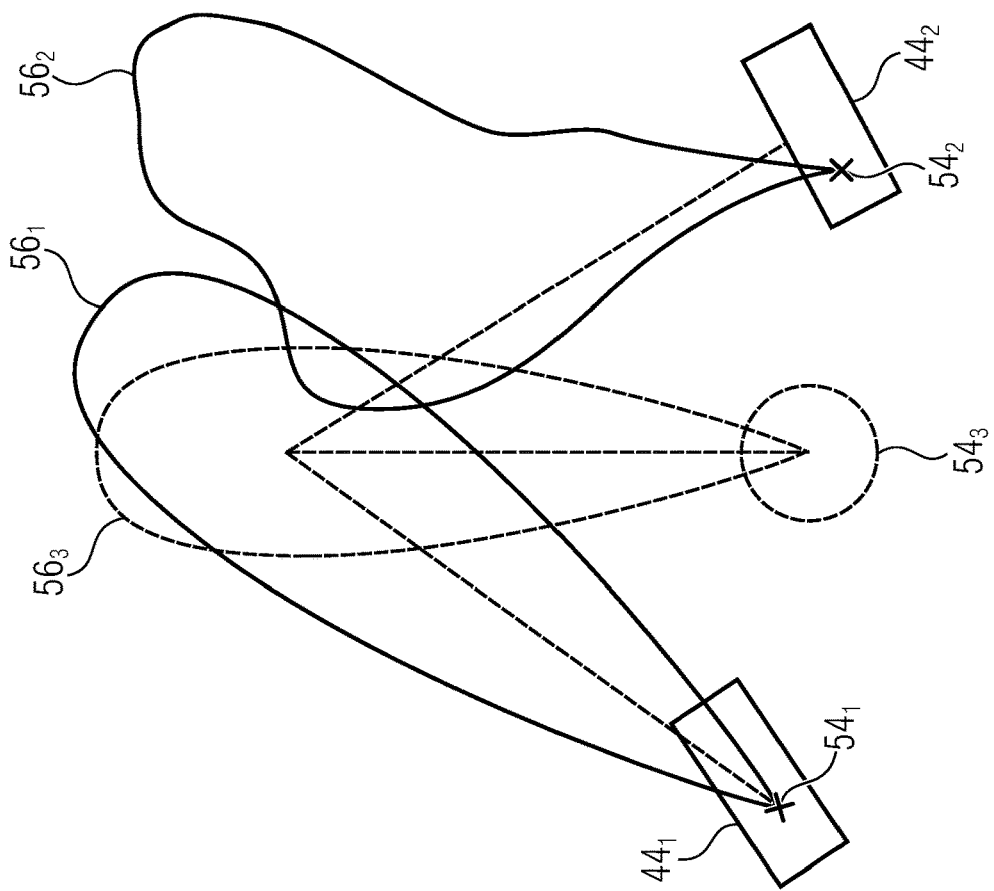
FIG. 3d is a schematic diagram of beams that may be formed with antenna arrays operating according to the schedule of FIG. 3 and according to an embodiment.
Figure 3C:
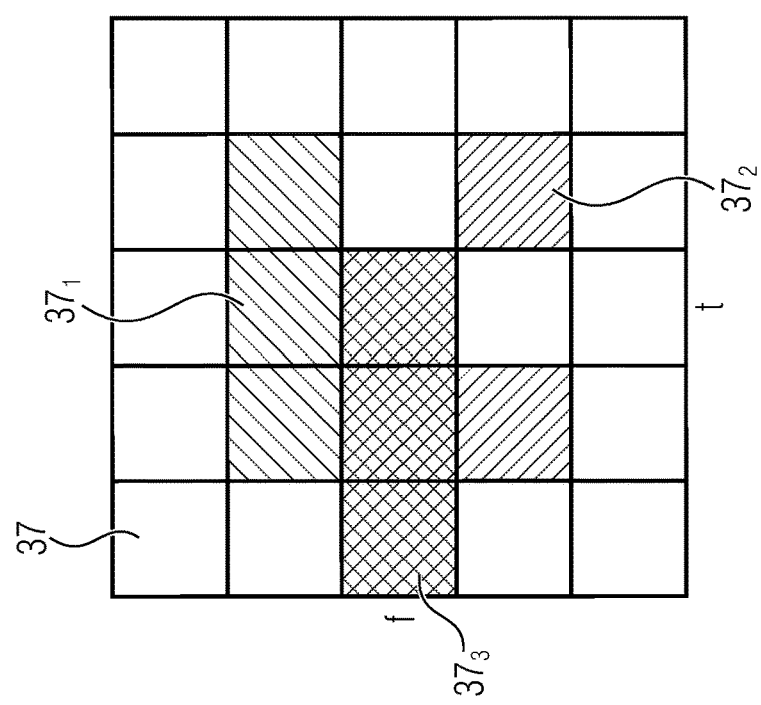
FIG. 3c a schematic diagram illustrating a schedule of resource elements in a wireless communications network in a time/frequency plane according to an embodiment.

FIG. 3c is a schematic diagram illustrating a schedule of resource elements 37 in a wireless communications network in a time/frequency plane.

FIG. 3d shows a schematic diagram of beams $56_1$ and $56_2$ that may be formed with antenna arrays $44_1$ and $44_2$ operating according to the schedule of FIG. 3c. Resource elements $37_1$ shaded from the upper left to the lower right may be used to form the beam $56_1$ with the antenna array $44_1$, wherein resource elements $37_2$ shaded from the upper right to the lower left may be used to form the beam $56_2$ with the antenna array $44_2$. Common resource elements $37_3$ being cross-shaded, be used by both antenna arrays $44_1$ and $44_2$, for example, to transmit common control messages. With respect to the resource elements $37_3$, the beams $56_1$ and $56_2$ may have the same pattern in the time/frequency space. For example, in FIG. 3d, by a superpositioning of the beams $56_1$ and $56_2$, a common beam $56_3$ may be formed based on a use of the common resource elements $37_3$. This beam $56_3$ may have the virtual reference origin $54_3$ which may be referenced or determined with respect to the CORR. The virtual reference origin may be arranged, for example, between the (real) reference origins $54_1$ and $54_2$ of beams $56_1$ and $56_2$. The virtual reference origin $54_3$ may be placed in a symmetry plane with respect to the beams $56_1$ and $56_2$.

Thus, the DUT may form a plurality of beams. The first beam $56_1$ is formable with the first antenna array $44_1$ and the second beam $56_2$ is formable with the second antenna array $44_2$, wherein the first and second beams at least partially comprise a common pattern in a time and frequency space and thereby form a third beam $56_3$ comprising a reference origin $54_3$ being arranged spaced from the reference origin $54_1$ of the first beam $56_1$ and the reference origin $54_2$ of the second beam $56_2$. Based on a varying power of at least one beam $56_1$ and/or $56_2$ a varying relationship of powers between the beams, an orientation of the beam $56_3$ may be changed.

Embodiments relate to a DUT that may comprise one or more antenna arrays and/or wherein at least one of the antenna arrays comprises itself a number of subarrays, the number being any number greater than one.

For example, the antenna arrays or subarrays may be arranged in a tiled structure. Such a structure may be referred to as an arrangement of antenna panels, wherein each antenna panel may be a functional unit of an antenna array or subarray. Each of these panels may be designed so as to form one or more beams for transmission and/or reception purposes. Further, a combined beam may be formed using at least two beams of a single panel and/or of different panels.

These embodiments may apply to arbitrary arrangements of panels and sub-panels, examples of which could include both regular and irregular tiling schemes. In view of the DUT, the wireless interface of the DUT may comprise a plurality of antenna subarrays, each subarray configured for forming at least a portion a beam pattern, combined beam or the like.

According to an embodiment, for each subarray a CORR may be defined. Alternatively or in addition, a CORR may be defined for at least one combined beam being formed by a single subarray or a combination of subarrays. Defining a CORR for a single subarray or for each subarray may allow for a simple evaluation of beams formed with the subarrays, wherein defining a CORR being based on at least a first and a second subarray may allow for a simple evaluation of combined beams of the DUT. It is noted that one solution is combinable, without limitation, with the other, i.e., CORR may be defined for a subarray and for a combination thereof at a same time.

Figure 3E:
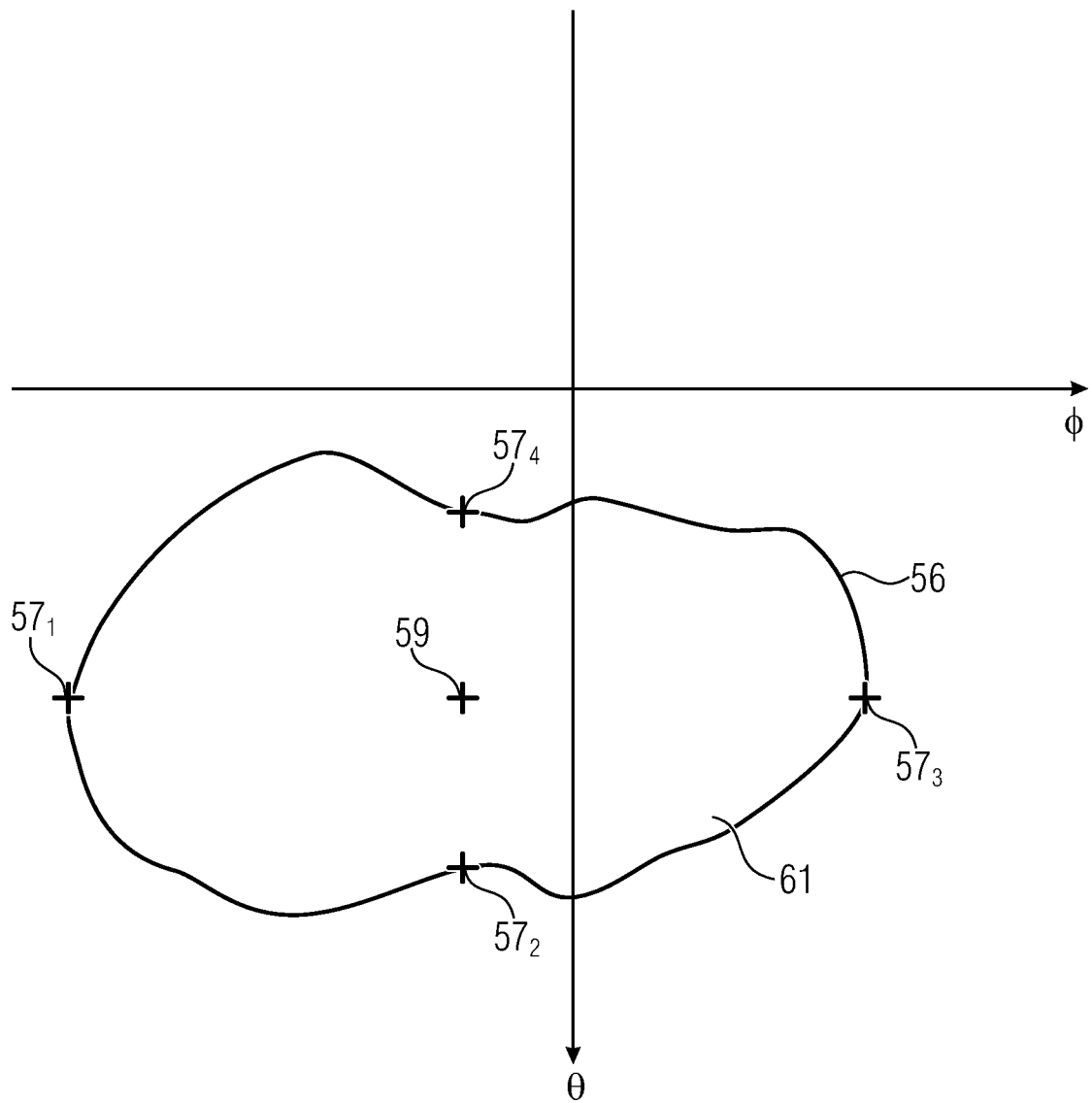
FIG. 3e is a schematic diagram of a use case according to present embodiments.

FIG. 3e is a schematic diagram of a use case according to present embodiments. An example cross-section of a beam 56 may be evaluated using different conformance/measurement points $57_1$ to $57_4$ being arranged around a symmetry point, axis or plane 59 indicating a symmetry of the beam 56. The angles $\phi$ and $\Theta$ denote the elevation and azimuth directions relating to the beam and the respective antenna array(s). The symmetry point, axis or plane 59 may form a center for measurements in connection with an error vector magnitude (EVM), i.e., a center of EVM directions range. A plane 61 may be formed according to declarations with respect to an OTA EVM direction range, i.e., an area of the cross-section that has to be evaluated. This area may depend on a distance with respect to the point of origin, and may increase for a defocused beam or decrease for a focused beam. Knowing point, axis or plane 59 may thus allow for positioning the points 57 and to evaluate the beam 56. According to embodiments, the point, axis or plane 59 may be defined as CORR and the points 57 may be used as measurement points.

FIG. 4a is a schematic flowchart of a method 400 that may be implemented for determining a location information, for example, during the step 120. In a step 410, a set of beams formable with the DUT is defined. For example, the set of beams may include the beam $56_1$, $56_2$ and/or $56_3$.

A step 420 comprises determining, for each of the beams within the set of beams, an offset of a reference origin of the beam with respect to the CORRP and a directional deviation of a beam direction with respect to a reference direction, such that the location information allows it to indicate the reference origin and the beam direction with respect to the CORRP. The offset of the reference origin, e.g., reference origins $54_1$, $54_2$ and/or $54_3$, may be a position of the respective reference origin within the 3D coordinate system 36. The offset may thus relate to an offset of the respective reference origin with respect to the center of origin 38 and/or a position in the measurement environment. The deviation in the reference direction may relate to a direction within the coordinate system 36. The reference direction may be, for example, a direction along one or more of the axes and/or directions within coordinate system. Any direction within the coordinate system 36 may be used as reference direction such that the directions $58_1$, $58_2$ and $58_3$ indicate a direction of the respective beam $54_1$, $54_2$ and/or $54_3$ within the 3D coordinate system 36.

In other words, the CORRP may be described by four points (three reference markers and the center of origin of the coordinate system) and three axes which may be perpendicular axes, and at least span a 3D space.

The CORRP and/or location information may be provided as a reference point/vector set in a three-dimensional space which allow for determination of a relative and axial position and description in space, especially of i) a point and/area where the waves (beams) are emitted from, ii) point and/or areas where distributed antennas are positioned; iii) point and/or areas of a superpositioned/effective antennas/antenna-arrays which emit radio waves; and/or iv) indicate polarization effects. Point ii) does not necessarily comprise to define a position of antennas, although it is possible. Manufacturers may use the invented reference point CORRP rather than reveal the location of the antenna(s) within a device. Thus, the exact antenna/antenna array location may but is not required to be revealed by the description of the CORRP but allows for a rather more general location where the beam pattern seems to originate from. Of course it could be an antenna location in itself. Furthermore, when a device comprises a number of antennas or a number of antenna arrays, the specification of the location of same may be tedious and could result in misinterpretation which in turn might affect accuracy. Therefore a single CORRP for each device, regardless of the number of antennas it contains, provides advantages in terms of keeping details of the device undisclosed, in enhancing accuracy of the measurements and/or in effectively defining a measurement environment.

Relative to the CORRP pointing vectors may be defined in order to relate the antenna array, the beam respectively with the CORRP. This may include a) a point of origin of emitted radiation and/or b) a relative coordinate system to describe i) a positioning of an array surface 3D space; ii) directions of emissions, such as, the directions 58, and/or iii) a reference point and vectors for emission. The reference points or reference markers may be accessible from the outside of the device or relative to specific markers or device specific boundaries of the device, e.g., faces, planes, corners, edges or the like. Thus, the set of reference markers may also include corners or edges of DUT housing.

As shown in FIG. 4b, similar to defining the 3-dimensional orientation information, defining the CORR may comprise the step 410, i.e., defining a set of electromagnetic wave patterns formable with the DUT, the set of electromagnetic wave patterns including the electromagnetic wave pattern. Further, for each of the electromagnetic wave patterns within the set of electromagnetic wave patterns, an offset of the reference origin of the electromagnetic wave pattern with respect to the CORR may be determined in a step 460.

Figure 5A:
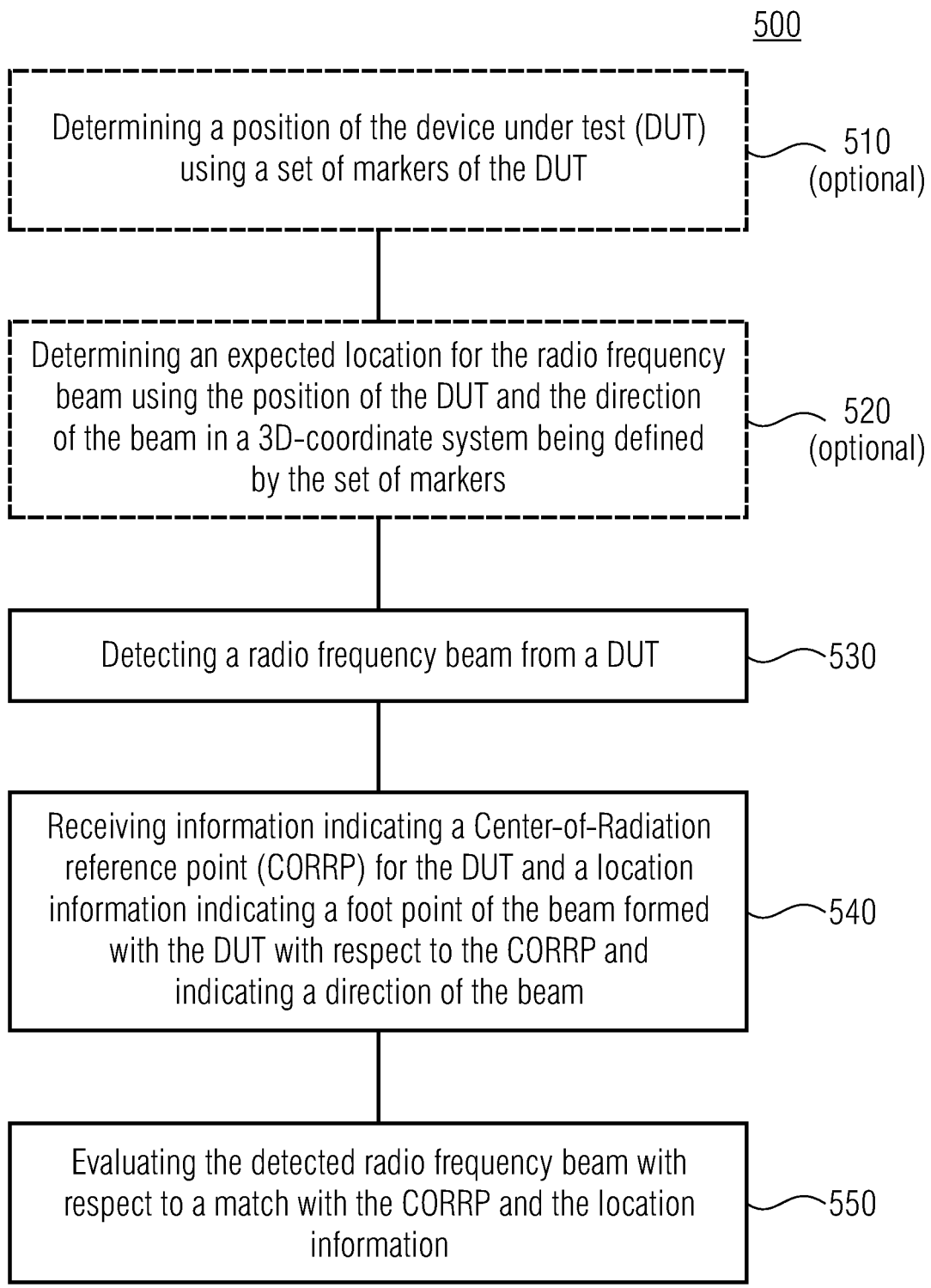
FIG. 5a is a schematic flowchart of a method according to an embodiment, that may be used for exploiting the information relating to the CORRP and/or the location information.

FIG. 5a is a schematic flowchart of a method 500 that may be used for exploiting the information relating to the CORRP and/or the location information. An optional step 510 comprises determining a position of the DUT using a set of markers of the DUT, e.g., the markers $32_1$ to $32_3$ as described, for example, in connection with FIG. 3b. An optional step 520 comprises determining an expected location for the radio frequency beam using the position of the DUT and the direction of the beam in a 3D-coorindate system being defined by the set of markers. A step 530 comprises detecting a radio frequency beam from a DUT. The radio frequency beam may be, for example, a receiver beam and/or a transmit beam. A step 540 comprises receiving information indicating a Center-of-Radiation Reference (CORR) for a DUT, the CORR indicating a reference origin of an electromagnetic wave pattern formed with the DUT. The step 540 comprises receiving a 3-dimensional orientation information with respect to the CORR, the 3-dimensional orientation information indicating a direction of the electromagnetic wave pattern. A step 550 comprises evaluating the detected radio frequency beam with respect to a match with the CORRP and the location information. An order of performing steps 530 and 540 may be arbitrary. I.e., step 530 may be performed before, after or even simultaneously with step 540. The step 550 may comprise certain evaluation steps, for example, if the beam characterized by the location information matches with the radio frequency beam detected from the DUT. Such a match may comprise a match of the reference origin and/or a match of a physical extension of main lobes and/or side lobes but is not limited hereto. The electromagnetic wave pattern may be a 3D-pattern of the radiation and may be formed arbitrary. Such a 3D pattern may include information relating to main lobes and/or side lobes, for example, when the electromagnetic wave pattern comprises a beam. The 3D pattern may not suitably be described by terms of main lobe or side lobe, for example, when having large opening angles in elevation and/or azimuth direction. The 3D-pattern may be any formed or shaped radiated beam pattern/field which can be described relatively to a given CORRP and direction.

The location information may comprise information indicating at least one main lobe for the beam and/or at least one side lobe of the beam. Such information may comprise an angular formation where, i.e., with reference to the CORRP and/or the reference origin and/or along which direction a respective main lobe or side lobe extends within the beam. Evaluating the detected radio frequency beam, for example, when performing step 550, may comprise an evaluation of the detected radio frequency beam with respect to the at least one main lobe of the beam and/or the at least one side lobe of the beam. An order of the steps 510 and/or 520, when performed, may be independent from an execution of steps 530 and/or 540, i.e., it may be sufficient to implement the steps 510, 520, 530 and 540 as far as executed before executing step 550. As explained before, the electromagnetic wave pattern is not limited to beams. When, for example, the CORRP and the reference direction for the description of a radiated beam pattern is provided, the exact shape of the pattern may be arbitrary and does not require the definition of one or several main lobes or side lobes. A description of such particular features towards specific directions in three dimensions may be implemented in some embodiments but may relate to more general features of the 3D electromagnetic wave pattern.

Figure 5B:
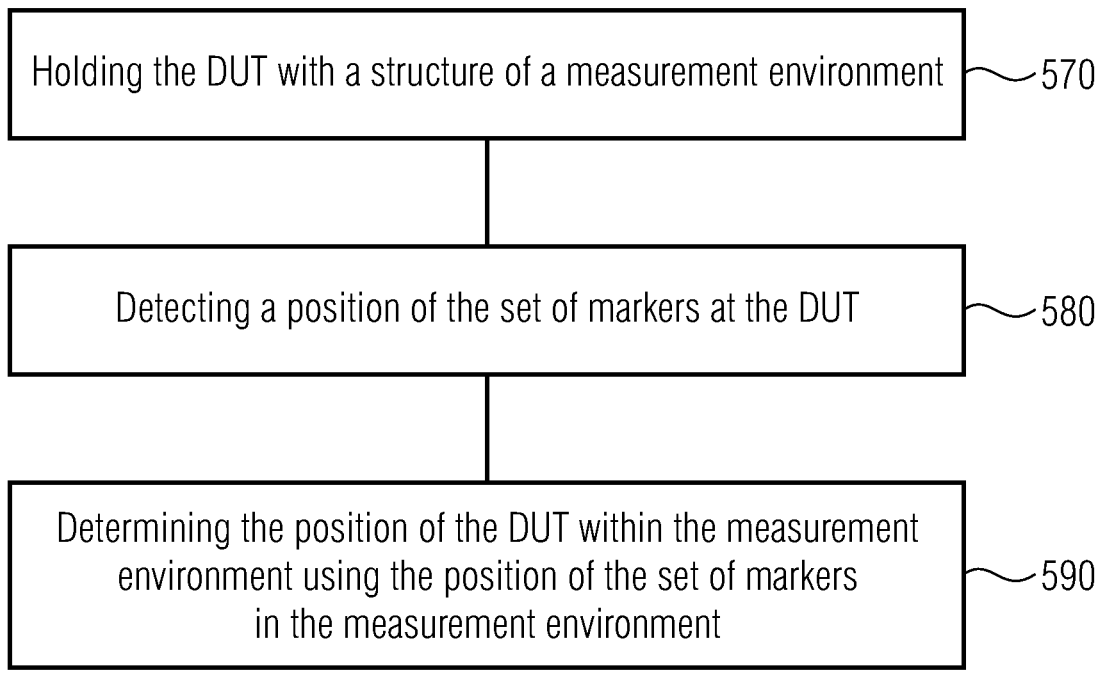

FIG. 5b shows a schematic flow chart of a method 560 that may be implemented, for example as part of step 510, when performed. A step 570 comprises holding the DUT with a structure of a measurement environment such as the structure 35 of the measurement environment 31. A step 580 comprises detecting a position of the set of markers such as the markers $32_1$ to $32_3$ at the DUT. A step 590 comprises determining the position of the DUT within the measurement environment using the position of the set of markers in the measurement environment.

Figure 6:
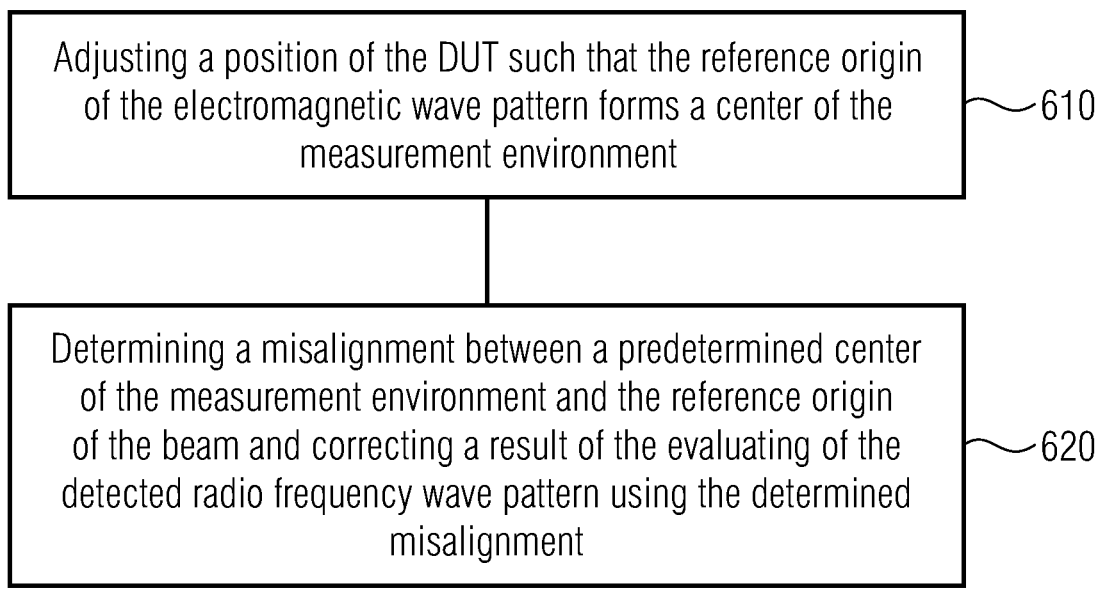
FIG. 6 is a schematic flow chart of a method according to an embodiment that may be performed together with the method of FIG. 5.

FIG. 6 is a schematic flow chart of a method 600 that may be performed together with method 500, for example, responsive to results of step 550. In a step 610 a position of the DUT is adjusted such that the reference origin of the beam forms a center of the measurement environment that is used for detecting and/or evaluating the radio frequency beam. Alternatively or in addition step 620 may be performed in which a misalignment between a predetermined center of the measurement environment and the reference origin of the radio frequency beam may be determined. A result of the evaluating of the detected radio frequency beam may be corrected, using the determined misalignment.

I.e., the results of step 550 may be corrected. For example, when the measurement indicates that a reference origin of the detected radio frequency beam is at a different location as indicated in the location information, the DUT may be shifted with respect to the probes, i.e., the probes and/or the DUT may be moved so as to allow for a precise categorization of the radio frequency beam. Alternatively or in addition, the detected misalignment may be considered in the results.

Using steps 610, 620 respectively, in case of misalignments and knowledge about the CORRP for two different beams at the same or different frequency the resulting deviations might be used to post-compensate (610) the misalignment or pre-compensate iteratively before repeating the measurement. (620)

As described above, the detection of the radio frequency beam may relate to detecting (receiving) the beam from the DUT and/or detecting the beam with the DUT when receiving the radio frequency beam by use of the DUT.

Figure 7:
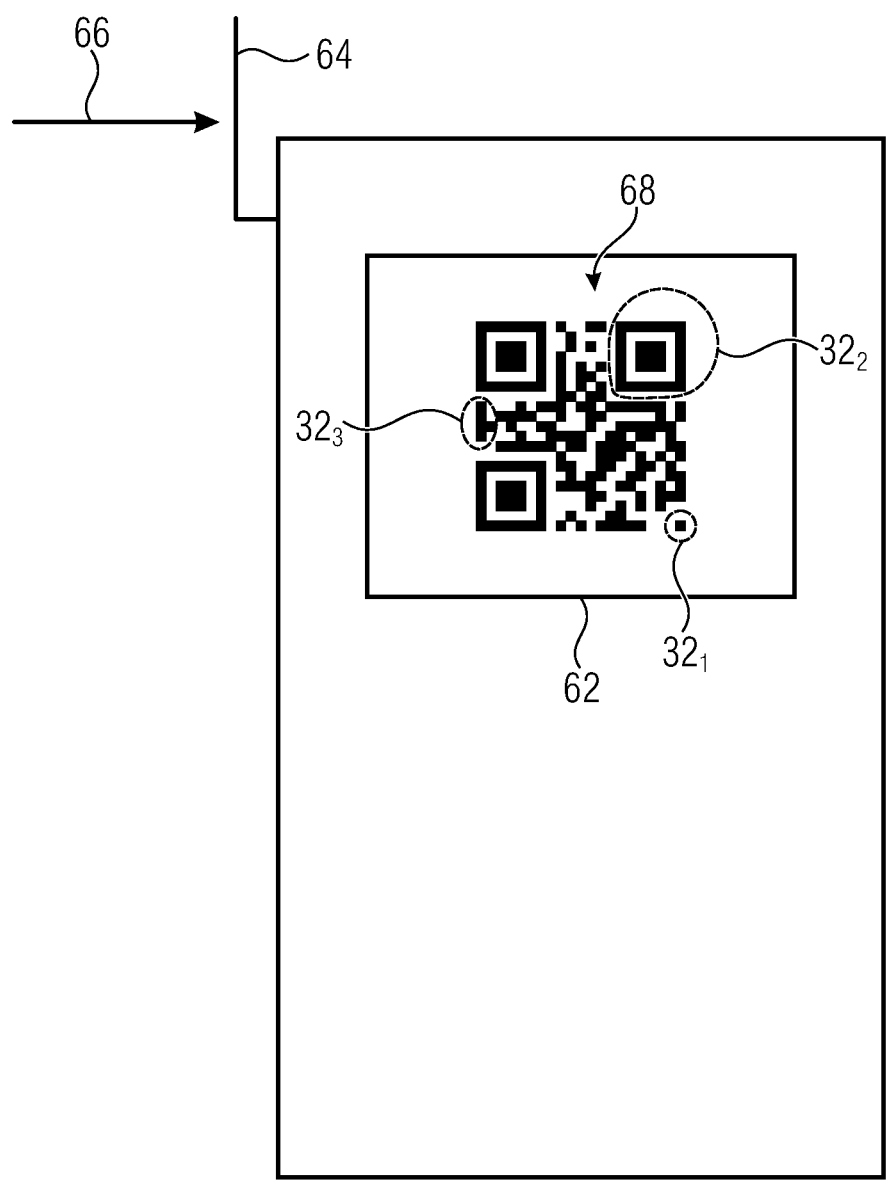
FIG. 7 is a schematic block diagram of a device 70 that may be used as a device under test according an embodiment.

FIG. 7 is a schematic block diagram of a device or apparatus 70 that may be used as a device under test according an embodiment. The apparatus 70 may comprise a display 62 and an interface 64. The interface 64 may be configured to receive a signal 66 indicating a request that the apparatus 70 is requested to perform a test mode. The interface 64 may be, for example, a wireless communication interface, such as an interface comprising an antenna or an antenna array. In this case, the signal 66 may be a wireless signal. The apparatus 70 is configured to switch to the test mode responsive to the signal 66 and to display a predefined optical signal pattern 68 with the display. The optical signal pattern may comprise one or more pictures and/or points and/or dots that may be used as a number of 1, 2, 3 or more reference markers $32_1$ and/or $32_2$ and/or $32_3$. I.e., the optical signal pattern 68 provides at least a part of a set of reference markers at the apparatus 70. When referring again to the DUT 30, it may be seen that at least one of the reference markers $32_1$, $32_2$ and/or $32_3$ may be implemented by respective parts or portions of the optical signal pattern 68. The apparatus 70 may be configured to display the optical signal pattern independently from a user input indicating a change of displaying the optical signal pattern. Such a user input may be, for example, a request to vary a size of the pattern, a position of the pattern in the display 62 and/or a request to display a different pattern. Thus, the optical signal pattern 68 may be immobile with respect to a housing of the apparatus 70 and may thus act as a reference marker. For example, the optical signal pattern may be a barcode of one or more dimensions including a matrix barcode for example a Quick Response (QR) code or a matrix barcode or a different two-dimensional code. A QR-code may provide for a high density of information to be displayed. This may be of advantage from, especially, when a number of beams is evaluated during a test. A specific optical signal pattern 68 may be associated with a respective beam and/or test mode. Thereby, the optical signal pattern may indicate the respective beam and/or test mode such that the apparatus 70 indicates a beam that is actually formed with the apparatus. The apparatus 70 may configured to subsequently switch on one of a plurality of test modes and/or beams or combinations thereof and to subsequently display one of a plurality of optical signal patterns. Each of the displayed optical signal patterns may be associated with the respective current test mode performed with the apparatus 70.

Figure 8A:
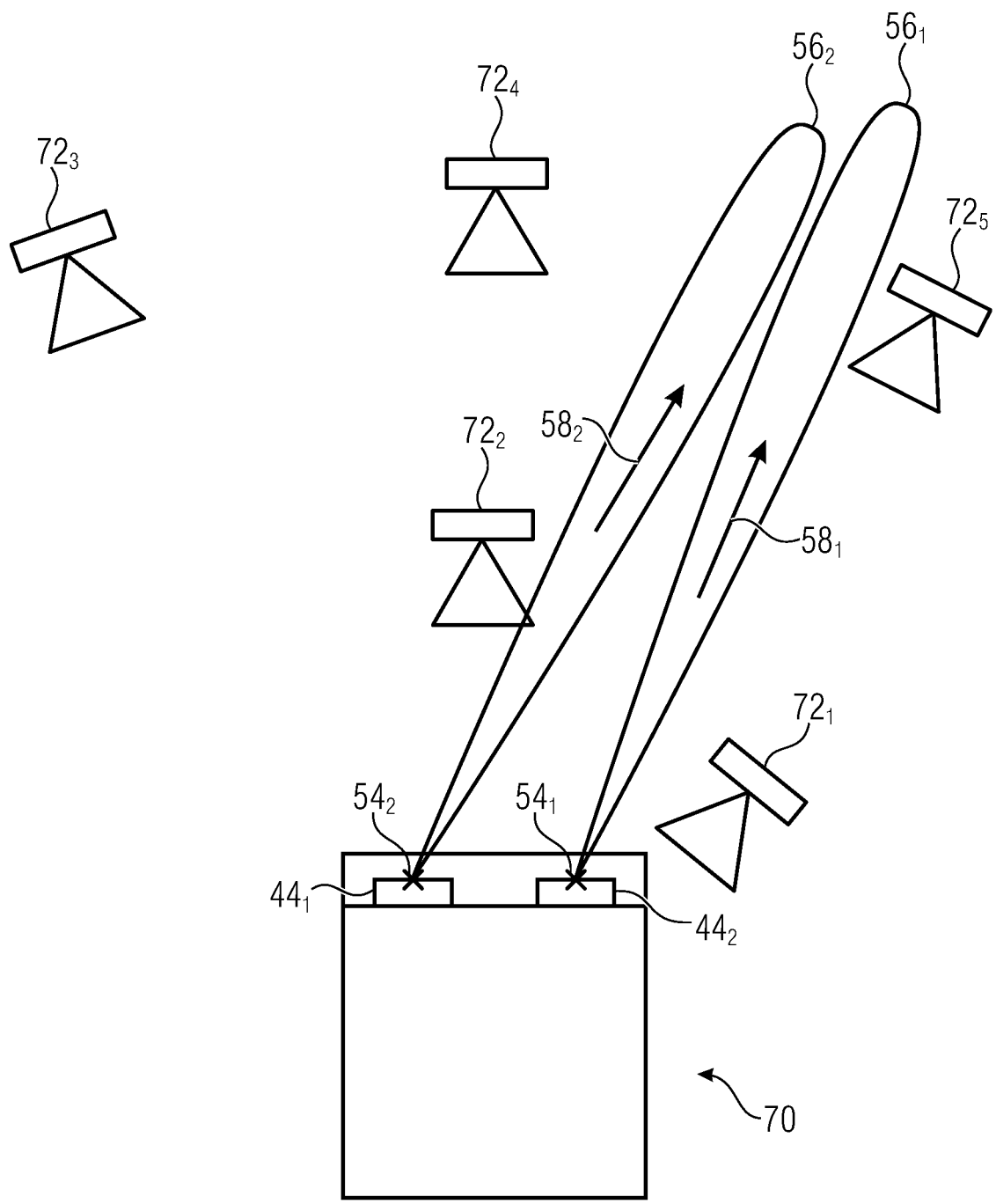
FIG. 8a is a schematic block diagram of a measurement system according an embodiment.

FIG. 8a is a schematic block diagram of a measurement system 80 according an embodiment. The measurement system 80 is configured to perform one or more of the methods described herein. For example, the measurement system 80 is configured to perform method 500 and/or 600. Optionally, the measurement system 80 may be configured to further perform at least one of the methods 100, 200 and/or 400. The measurement system 80 may comprise a plurality of probes $72_1$ to $72_5$. One or more probes may be configured to evaluate the beam 56 in a near field, for example, the probes $72_1$. One or more probes may be configured to evaluate the beam 56 in a mid-field, for example the probe $72_2$. One or more probes may be configured to evaluate the beam 56 in a far field of the beam 56, for example, the probes $72_3$, $72_4$ and/or $72_5$.

The measurement system 18 may be configured to evaluate a DUT, for example, apparatus 30 and/or 70. The location information obtained and used with the measurement 18 may comprise information indicating the reference origin $54_1$ of the beam $56_1$. The location information may comprise information indicating reference origins $54_1$ and $54_2$ of the respective beams $56_1$ and $56_2$. The location information may further comprise information relating to a direction $58_1$ and $58_2$ of the respective beam. The measurement system may be configured for evaluating the detected radio frequency beam $56_1$ and/or $56_2$ with respect to a match of a superpositioned with the beam $56_1$ and $56_2$. As described in connection with FIG. 3, a summarized beam may be obtained by a superposition of single beams $56_1$ and $56_2$ and/or further beams. The measurement system 18 may comprise a control unit and/or an evaluating unit that is configured to evaluate the results obtained by the DUT (evaluating a receive beam) and/or the probes $72_1$ to $72_5$ (transmit beams).

When detecting beams $56_1$ and/or $56_2$ and/or a superposition of the beams in the near field of the beam, the measurement system 18 may be configured through extrapolate a characteristic of the beam in a far field of the beam. Based on a precise knowledge of the beam to be evaluated, i.e., the reference origin and the direction with respect to the CORRP, such extrapolation may be performed with a high precision.

Figure 8B:
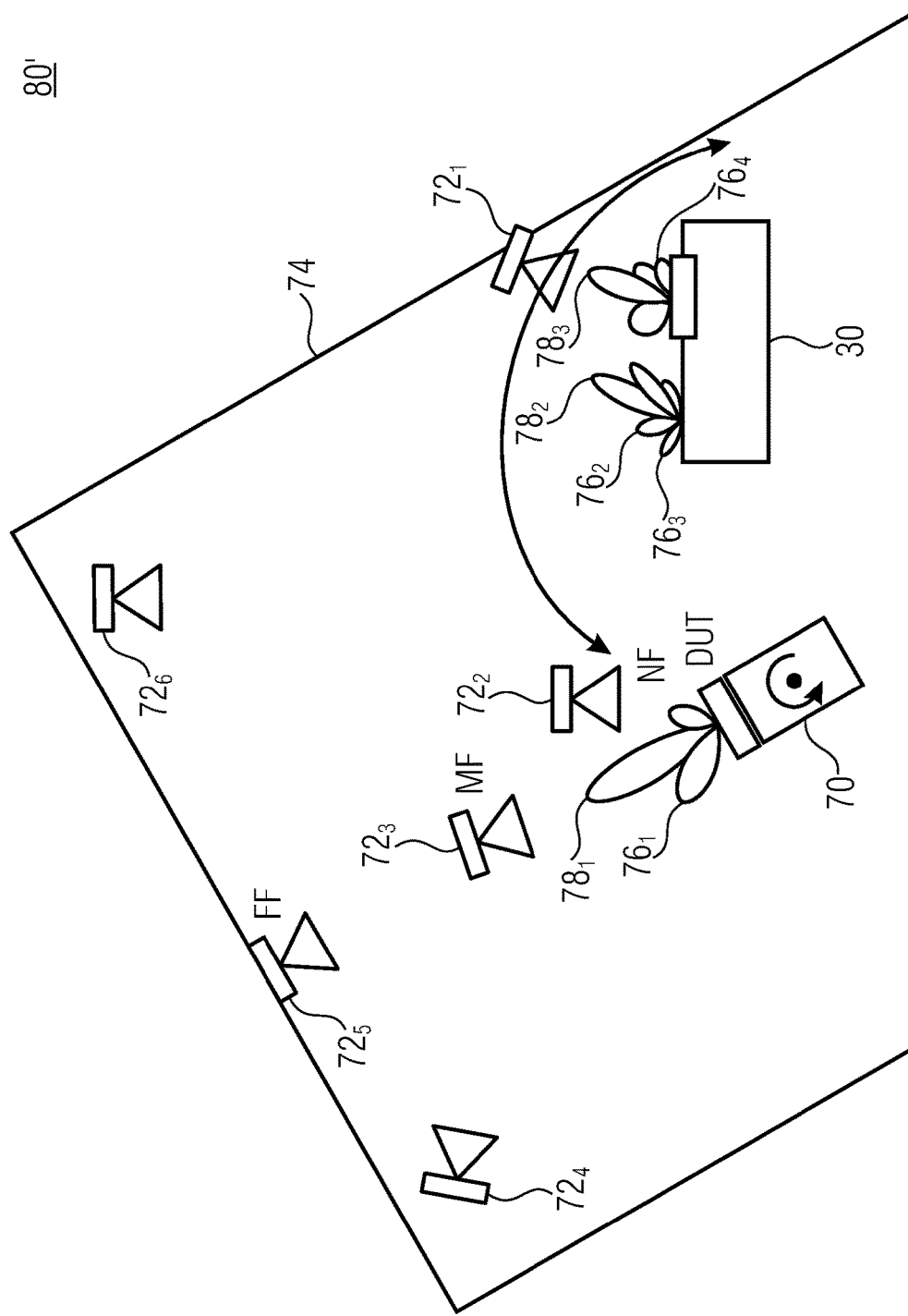
FIG. 8b is a schematic block diagram of a measurement system according to an embodiment, comprising a measurement chamber housing a plurality of probes.

FIG. 8b is a schematic block diagram of a measurement system 80' comprising a measurement chamber housing a plurality of probes $72_1$ to 726 that may be arranged in the near field (NF), the mid-field (MF) and/or the far field (FF). One or more probes, for example, probe $72_1$, may be movable within the measurement chamber 74. Alternatively or in addition, one or more of the evaluated DUTs, for example, the DUT 70 may be movable within the measurement chamber 74 so as to allow side lobes $76_1$ to $76_4$ and/or main lobes $78_1$ to $78_3$ to vary with respect to the position and/or orientation relative to the probes $72_1$ to $72_6$.

In other words, when using OTA measurement for characterization of, e.g., beams patterns it may be very important to know the exact reference point (source; reference origin) where the beam originates from. This may become even more important, if the OTA measurements are taking place in a near field or the DUT has large dimensions, for example, when being a car. Furthermore, when using high radio frequencies like e.g. millimeter waves at e.g. 28 GHZ, 39 GHz, 60 GHz and 7 or above the wavelength becomes very short an inaccuracies in nearfield measurements may cause rather large errors for the calculated far field pattern after transformation if the exact CORRP for an emitted beam is unknown. Another case may be provided from compact form factor devices like smart phones, tablets or laptops where either the exact location of the antennas is not known from the outside and/or when the device uses several antennas distributed across the device. In all of these cases, it may be crucial to know the reference point in order to evaluate the measured beam patterns accurately. Embodiments described herein introduce a 3D referencing scheme that allows to describe the referencing origin for every beam created by the DUT using the CORRP. Embodiments provide a solution to determine the reference point of every beam emitted correctly, especially from the outside of the device. This becomes evident if antennas and/or antenna arrays are distributed over a relatively large object like a car or the like which is positioned in a measurement setup/system during a measurement procedure to determine, e.g., a 3D radiated beam pattern around a DUT, it is known to mount a DUT in a measurement system on a holder surrounded by one or a multiple sensors at a certain distance (near field, mid field or far field) to measure specific parameters like power, phase, phase stability or the like. In order to scan the radiated pattern in 3D, either the DUT is rotated, shifted or moved such that the sensor observes the DUT under another observation angle or the sensor(s) around DUT at given distances. Alternatively, the two movements could be overlaid to have a 3D field scan. As illustrated for DUT 70 in FIG. 8b, the same may be mounted on a rotator to move the DUT. In the ideal case of a point like emitters, e.g., a wire as Hertzian dipole rotation about the wire center, the measure radiated pattern may result in a vary symmetric circular shape. In case of miss-position of the wire against the rotation center, a distorted radiation pattern may be observed, which can be easily compensated when the CORRP is known and considered during the measurement. The CORRP may comprise information relatively to the rotation center. Such compensation procedure could be performed after the measurements or, if possible, the movement may be pre-compensated such that the effective rotations axis falls aligned with the center of emission in the antenna already.

Figure 9A:
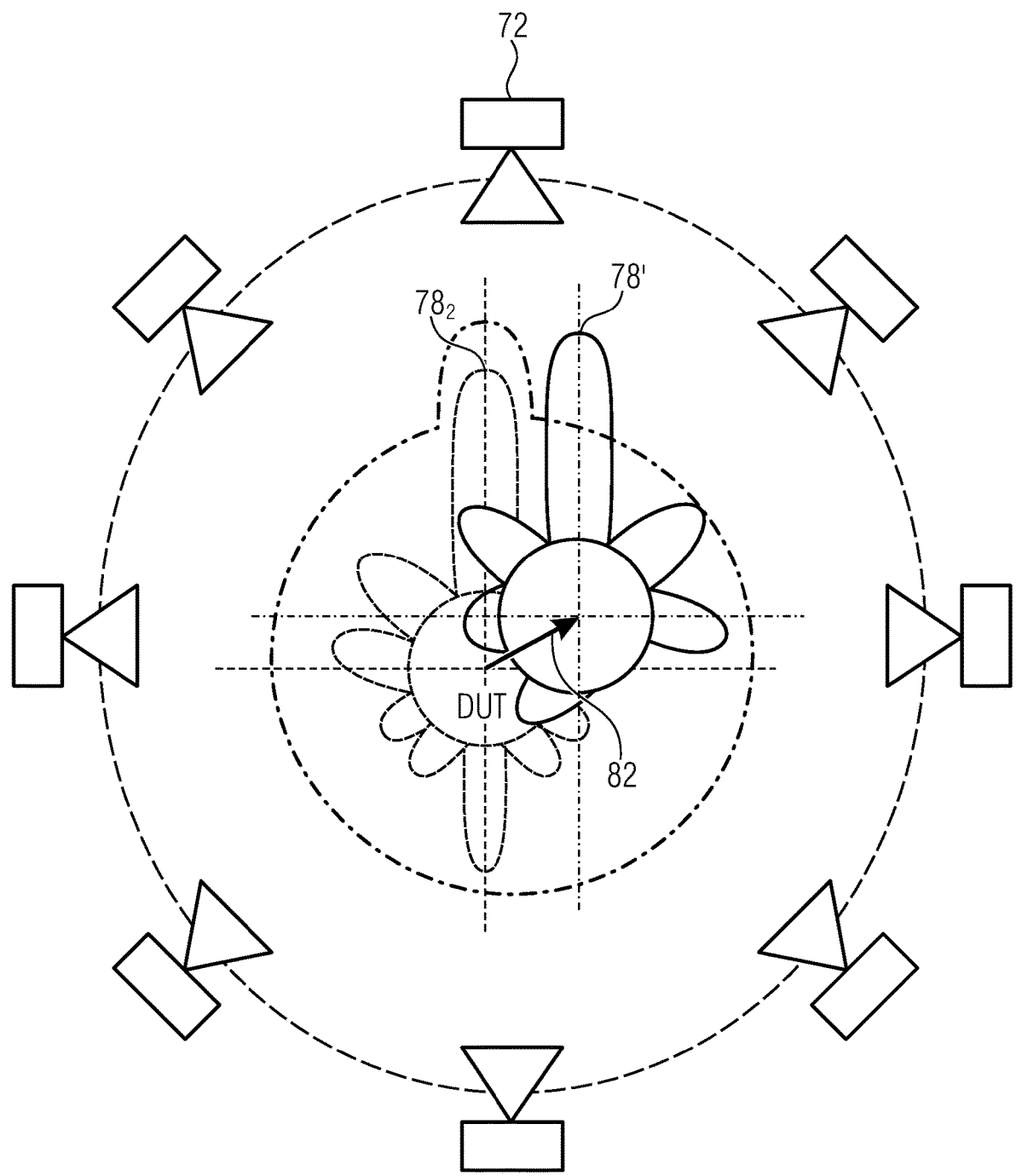
FIG. 9a is a schematic diagram illustrating an effect of missing knowledge about the Center-of-Radiation Reference Point according to an embodiment.

FIG. 9a shows a schematic diagram illustrating an effect of missing knowledge about the Center-of-Radiation Reference Point when a DUT is mounted within a sensor environment, i.e., a measurement system, for, e.g., radiated pattern measurements. A shift of the DUT along a direction 82 may lead to a shift of the main lobe 78 and/or other lobes emitted. By determining the beam and/or lobes with the probes 72, it may be difficult or impossible to determine, if this is a malfunction of the DUT and/or an effect caused by the misalignment, especially when the desired and/or actual position of antenna arrays is not known.

Example DUTs may be, for example, active antenna systems (AAS), base station antennas, user equipment such as a handset, a laptop, a vehicle a drone, an extended large size object like a leaky feeder cable or the like.

Figure 9B:
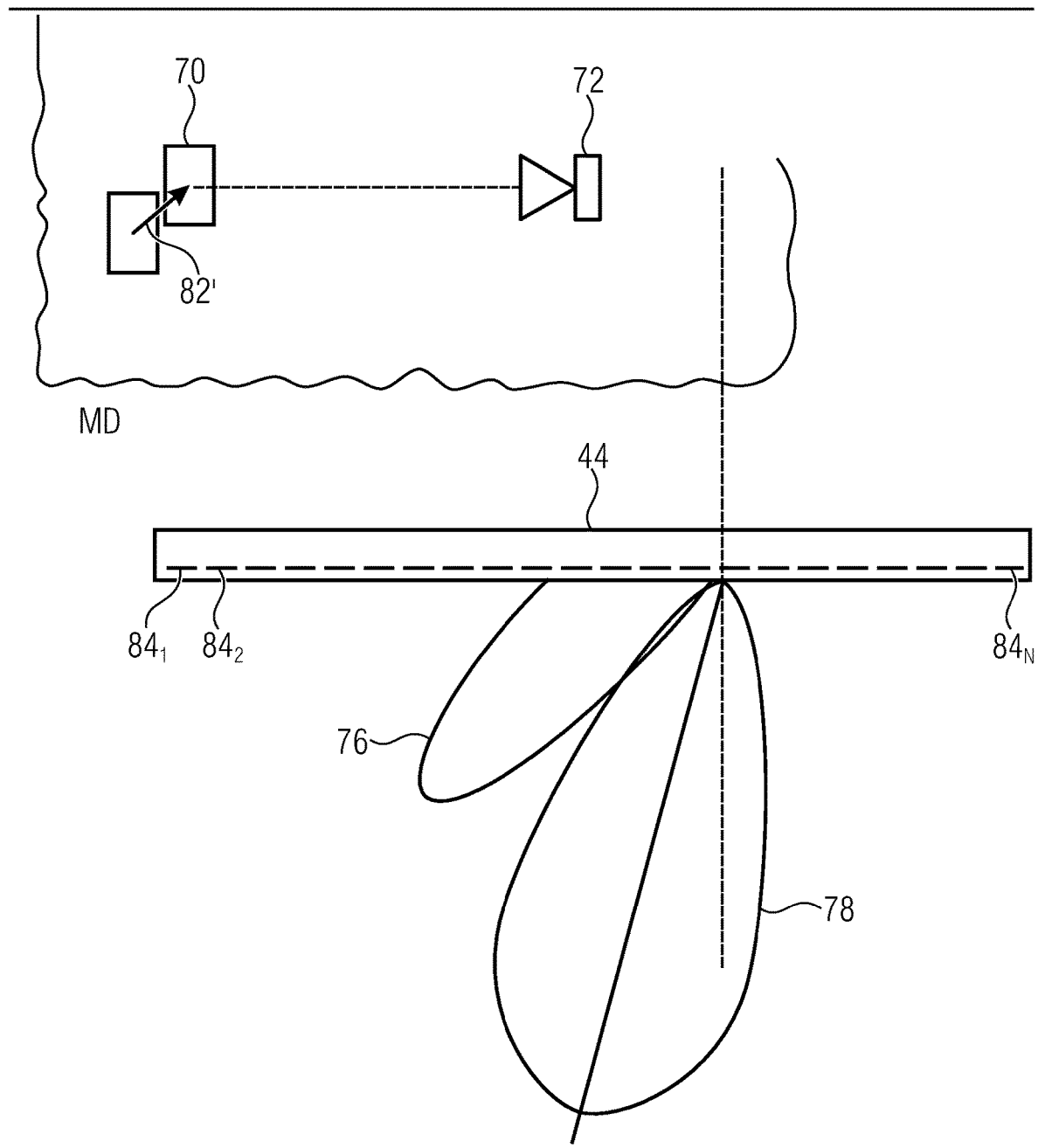
FIG. 9b is a schematic diagram illustrating a structure of an antenna array according to an embodiment.

FIG. 9b shows a schematic diagram illustrating a structure of the antenna array 44. The antenna array 44 may comprise a plurality of antenna elements 84₁ to 84_N. The CORRP may be used stand-alone or in combination with all information/instructions such as a request to align a specific component such as a probe, the DUT or another element with an edge of a device and/or to align a sensor perpendicular to a screen or a surface displaying the reference point on the display showing the test pattern. As illustrated, a shift 82' that may be inverse to the shift 82 of FIG. 9a may be implemented so as to align the DUT, e.g., the DUT 70, with one or more probes 72. This allows to exactly determine the side lobe 76 and/or the main lobe 78 of a beam. For example, a measurement system may use a search algorithm, e.g., in connection with a probe. When a respective marker or pattern may be observed with the probe 72, an alignment may be assumed and the CORRP may be used to determine whether the detected or determined beam matches the desired condition. This may be done using a search algorithm for aligning the DUT.

The embodiments described herein may be executed together, but may also allow for a distributed implementation. For example, a manufacturer of a device or DUT may perform one or more of the methods 100, 200 and/or 400. Thereby, a manufacturer may provide a reference point and/or reference points/vectors for each beam and/or beam sets supported by the device. This may include information in connection with one or more main lobes and/or one or more side lobes. The manufacturer further may provide information relating to frequencies or frequency ranges for transmission/reception for each of the beams. Each mode or sets of transmit modes may be indicated to be used for forming a specific beam. In specific modes, different antennas/antenna elements may be involved in the beam creation. Thereby, by indicating specific details on the antennas or antenna elements used, further details may be evaluated within the test.

The measurement system using the CORRP and/or the location information and/or implementing one or more of the methods 500 and 600 may include a DUT holder (carrier) and may be configured to offset the mounted DUT in 3D coordinates using vectors such that the reference point is centered through the usual measurement procedure (step 610) and/or the known misalignment is incorporated in correction of functions/transformations for the beam pattern evaluations (step 620).

The respective reference point may be a physical marker on the device or relative to corner stones and/or edges. This may include any kind of options on how to reference, e.g., to a plane, corner, edge, barcode, e.g. matrix barcodes such as QR-codes (defined in a plane and may have a size that is predetermined, etc. and that may be used as a reference for a coordinate system). A defining or marking of the CORRP may be done using the QR-code that may contain additional information such as information relating to values that may be bound/restricted to reasonable physical constraints. A one-dimensional or two-dimensional barcode such as a QR-code may be, implemented permanently, for example, using a printing, etching engraving, adhering step or the like so as to attach the code to the case, body, housing, cover cowling, enclosure and/or a radom of a DUT. Alternatively, such a code may be displayed on the screen of a UE when the UE is configured into a certain mode of operation that is convenient for measurement purposes. The position of the QR-code in all instances may be fixed. The QR-code itself may be read by a machine reading device such as a scanner or reader, e.g., by the device 33. Such a device may reads the information contained in the QR code and/or may be configured to determine the position of the QR-code on the DUT. Contained within the QR-code data, is in this case information that is used by the reader to determine the CORRP. In other words, the QR-code can be positioned in such a location that is convenient, practical, acceptable and/or aesthetic and does not form a marking of the CORRP itself per se. Furthermore, the QR code could define a physical feature at the outside of the DUT and a description on how to derive the CORRP relative to this marker by e.g. providing this information from a data base which can be a priori known or updated over time. Such information may be retrieved, for example, from accessing a website or other explicitly referenced source of information. At such source the content can be held available for download/access in an unchanged or changeable way ready to be updated if needed. Furthermore, such information set might have a version number to be referred to, when conducting the measurement in the sense: "such measurement on the DUT was performed according to measurement instruction ABC version 1.23" or the like.

Alternatively or in addition, the CORRP may be defined based on a mechanical marking such as a notch, an etching or a hole. Alternatively or in addition, a so-called badge marking may be implemented so as to obtain a sweet spot. Alternatively or in addition, a matrix code such as a QR-code may be displayed in the test mode and thereby use a user equipment screen (display) using dedicated pixel positions with the optical pattern. Alternatively or in addition, a lamp/camera lens/microphone, speaker or the like of the user equipment may be used as CORRP.

The embodiments described herein may allow for exactly referencing of where the waves/beams originally are omitted from. The embodiments allow to keep a nondisclosure of device-specific technical solutions by the manufacturer as it may be sufficient to define the CORRP and the location information. Embodiments may allow for a proper positioning of the device relative to the outer reference points visible/accessible at the device. Embodiments may allow for a correct transformation from near field to far field even with misaligned or distributed antennas as their behavior may be evaluated correctly with high precision. Symmetries in the beams may be identified more easily based on a correct determination of the reference origins and/or patterns of the beams. A measurement site or house, e.g., a laboratory, may use exactly the same reference point as the manufacturer without opening or destroying the DUT, using the CORRP. Embodiments described herein allow to define/use different reference points for combinations of antennas/arrays, etc. In a communication system, the proposed embodiments may be reused to ease functionality like a beam paring, i.e., CORRP may be used stand-alone and/or in combination with other methods such as search algorithms.

Alternatively or in addition, a beam coordination may be performed, e.g., when using several antenna arrays pointing along arbitrary directions. Embodiments offer a precise method for OTA measurement of the DUT radiation patterns which allows a standardized and fair comparison (benchmarking) to other peer devices or products.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] IEEE Standard for Definitions of Terms for Antennas, in IEEE Std 145-2013 (Revision of IEEE Std 145-1993), Mar. 6 2014.
[2] IEEE Standard Test Procedures for Antennas, in ANSI/IEEE Std 149-1979, vol., no., pp. 0_1-, 1979, reaffirmed 1990, 2003, 2008.
[3] Caner Ozdemir, Rajan Bhalla, and Hao Ling, "A Radiation Center Representation of Antenna Radiation Patterns on a Complex Platform", IEEE Transactions on Antennas and Propagation, Vol. 48, No. 6, June 2000.
[4] Jonas Friden, Gerhard Kristensson, "Calculation of antenna radiation center using angular momentum," IEEE Transactions on Antennas and Propagation, Vol. 61, No.12, December 2013.
[5] S. Kurokawa and M. Hirose, "Antenna gain pattern estimation for log periodic dipole array broadband antenna using near field radiation pattern and amplitude center," 2016 IEEE International Conference on Computational Electromagnetics (ICCEM), Guangzhou, 2016, pp. 191-193.

[6] 3GPP TS 37.145-2; V14.0.0 (2017-03), "Active Antenna System (AAS) Base Station (BS) conformance testing; Part 2: radiated conformance testing"

[7] 3GPP TR 37.976; V14.0.0.0 (2017-03), "Measurement of radiated performance for Multiple Input Multiple Output (MIMO) and multi-antenna reception for High Speed Packet Access (HSPA) and LTE terminals"

[8] 3GPP TR 37.842; V13.2.0 (2017-03), "Evolved Universal Terrestrial Radio Access (E-UTRA) and Universal Terrestrial Radio Access (UTRA; Radio Frequency (RF) requirement background for Active Antenna System (AAS) Base Station (BS)"

The invention claimed is:

1. An apparatus comprising:
a display; and
an interface configured to receive a signal indicating a request that the apparatus is requested to perform a test mode;
wherein the apparatus is configured to switch to the test mode responsive to the signal and to display a predefined optical signal pattern with the display, the optical signal pattern providing at least a part of a set of reference markers at the apparatus;
wherein the apparatus is configured to display the predefined optical signal pattern as at least the part of the set of reference markers at the apparatus for an evaluation a position of the set of reference markers with regard to a Center-of-Radiation Reference, CORR, for the apparatus, the CORR indicating a reference origin of an electromagnetic wave pattern formable with the apparatus.

2. The apparatus of claim 1, wherein the apparatus is configured to display the optical signal pattern independently from a user input indicating a change of displaying the optical signal pattern.

3. The apparatus of claim 1, wherein the optical signal pattern is a barcode of at least one dimension.

4. The apparatus of claim 1, wherein the apparatus is configured to subsequently switch on one of a plurality of test modes and to subsequently display one of a plurality of optical signal patterns, the displayed optical signals pattern associated with the current test mode.

* * * * *